(12) United States Patent
Kamio

(10) Patent No.: US 8,229,223 B2
(45) Date of Patent: Jul. 24, 2012

(54) IMAGE PROCESSOR, IMAGE FORMING APPARATUS, IMAGE PROCESSING METHOD AND COMPUTER READABLE MEDIUM

(75) Inventor: Mitsugu Kamio, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1056 days.

(21) Appl. No.: 12/166,429

(22) Filed: Jul. 2, 2008

(65) Prior Publication Data

US 2009/0123024 A1    May 14, 2009

(30) Foreign Application Priority Data

Nov. 12, 2007   (JP) .................................. 2007-293048

(51) Int. Cl.
*G06K 9/00* (2006.01)
(52) U.S. Cl. ........................................................ 382/181
(58) Field of Classification Search .................. 382/181, 382/190, 218, 203, 209
See application file for complete search history.

(56) References Cited

U.S. PATENT DOCUMENTS

| | | | |
|---|---|---|---|
| 5,845,008 A | 12/1998 | Katoh et al. | |
| 6,115,494 A * | 9/2000 | Sonoda et al. | 382/165 |
| 6,307,963 B1 * | 10/2001 | Nishida et al. | 382/190 |
| 7,227,661 B2 | 6/2007 | Matsunoshita | |
| 7,916,344 B2 * | 3/2011 | Nakai et al. | 358/1.9 |
| 8,035,866 B2 * | 10/2011 | Sato | 358/451 |
| 2001/0053250 A1 | 12/2001 | Murakawa et al. | |
| 2004/0165202 A1 * | 8/2004 | Nakagawa | 358/1.9 |
| 2006/0279767 A1 * | 12/2006 | Lim | 358/1.14 |
| 2007/0159649 A1 | 7/2007 | Nakai et al. | |

FOREIGN PATENT DOCUMENTS

| | | |
|---|---|---|
| JP | 7-212584 A | 8/1995 |
| JP | 10-243127 A | 9/1998 |
| JP | 2000-307857 A | 11/2000 |
| JP | 2001-307101 A | 11/2001 |
| JP | 2001-320582 A | 11/2001 |
| JP | 2002-057894 A | 2/2002 |
| JP | 2003-283790 A | 10/2003 |
| JP | 2007-184770 A | 7/2007 |

OTHER PUBLICATIONS

Computer English translation of Japanese patent No. JP-307857, pp. 1-15, Feb. 11, 2000.*

* cited by examiner

*Primary Examiner* — Daniel Mariam
(74) *Attorney, Agent, or Firm* — Sughrue Mion, PLLC

(57) ABSTRACT

The image processor is provided with: a detection unit that detects plural specified images each having a shape from an image read out by an image reading apparatus; a first determination unit that determines presence or absence of other specific image other than a specified image out of the plural specified images detected by the detection unit, in a position determined in advance for the specified image; and a second determination unit that determines whether or not the specified image is to be subjected to a processing on the basis of a result of the determination of the presence or absence of the other specified image by the first determination unit.

9 Claims, 27 Drawing Sheets

INHIBITION CODE ARRAY 0

INHIBITION CODE ARRAY 1

CONDITION CODE ARRAY

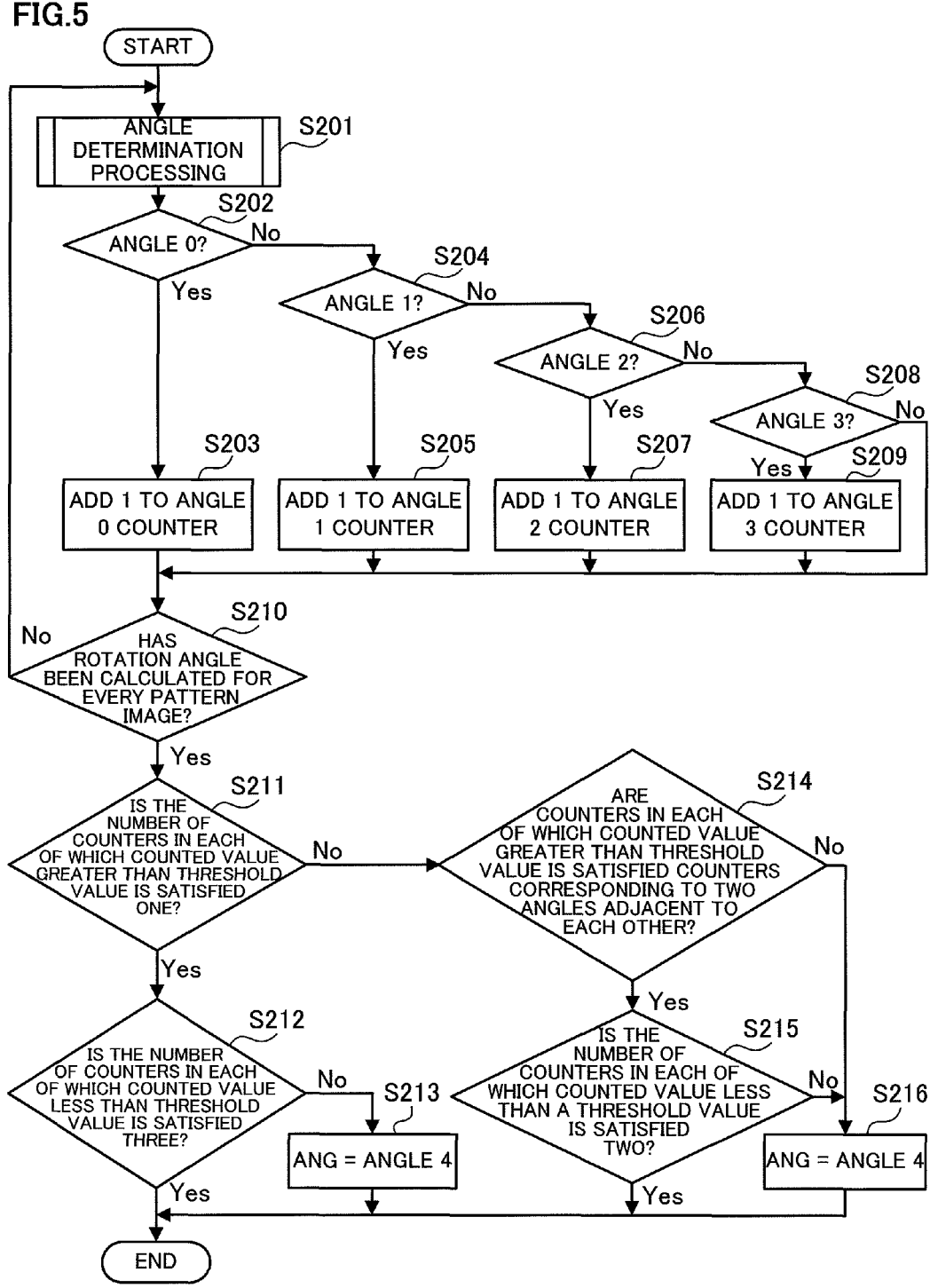

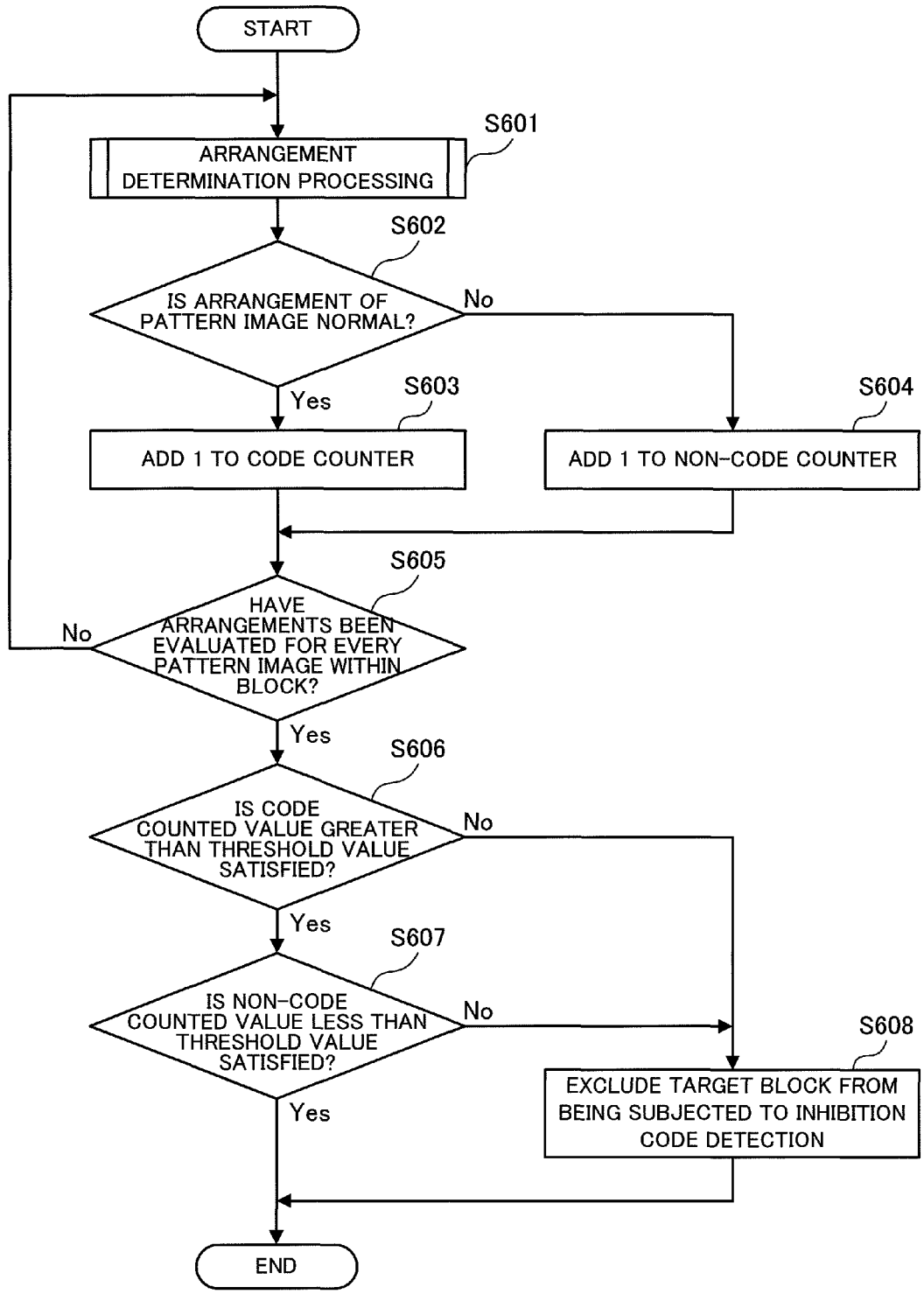

IMAGE PROCESSOR, IMAGE FORMING APPARATUS, IMAGE PROCESSING METHOD AND COMPUTER READABLE MEDIUM

CROSS REFERENCE TO RELATED APPLICATIONS

This application is based on and claims priority under 35 USC §119 from Japanese Patent Application No. 2007-293048 filed Nov. 12, 2007.

BACKGROUND

1. Technical Field

The present invention relates to an image processor, an image forming apparatus, an image processing method and a computer readable medium storing a program.

2. Related Art

There are some techniques known to prevent unauthorized copying when an image of an original document is read out by a copying apparatus.

SUMMARY

According to an aspect of the invention, there is provided an image processor including: a detection unit that detects plural specified images each having a shape from an image read out by an image reading apparatus; a first determination unit that determines presence or absence of other specific image other than a specified image out of the plural specified images detected by the detection unit, in a position determined in advance for the specified image; and a second determination unit that determines whether or not the specified image is to be subjected to a processing on the basis of a result of the determination of the presence or absence of the other specified image by the first determination unit.

BRIEF DESCRIPTION OF THE DRAWINGS

Exemplary embodiment(s) of the present invention will be described in detail based on the following figures, wherein:

FIG. 5 is a flowchart illustrating an operation example during the inhibition block determination processing;

FIG. 22 is a flowchart illustrating a furthermore operation example during the inhibition block determination processing;

DETAILED DESCRIPTION

In the following section, exemplary embodiments for carrying out the present invention will be described in detail with reference to attached drawings.

First, a description will be given of an embedded image that is superimposed on a document image, and then printed out on a medium, such as a sheet of paper, in the present exemplary embodiment.

Figure 1A:
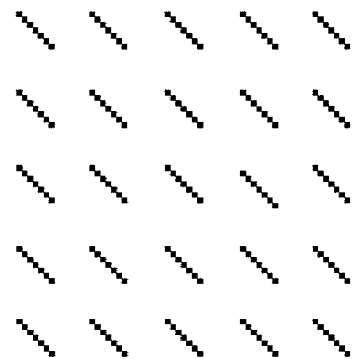
FIGS. 1A to 1C are enlarged images each taken from a part of such an embedded image.
Figure 1B:
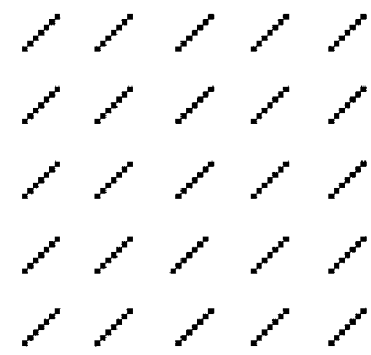
Figure 1C:
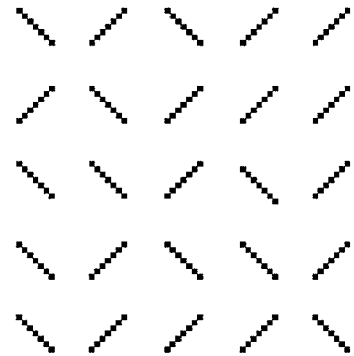

FIGS. 1A to 1C are enlarged images each taken from a part of such an embedded image.

As shown in the figures, the embedded image is composed of pattern images including patterns of diagonal strokes falling from left to right or patterns of diagonal strokes rising from left to right. In the present exemplary embodiment, the pattern of the diagonal stroke falling from left to right represents a bit "0," while the pattern of the diagonal stroke rising from left to right represents a bit "1." The size of the individual pattern images is configured to be in a range of 12 pixels both in a main scanning direction and in a sub scanning direction.

It should be noted that the term "medium" used in this specification may refer to any kind of medium as long as an image is printable on the medium, and the material thereof is not limited. The material of the "medium," although represented by paper, may be an OHP sheet, a metal plate, cloth or the like.

In the following section, images illustrated in FIGS. 1A to 1C will be described.

First, FIG. 1A illustrates an image representing an inhibition code array 0. In the present case, the inhibition code array 0 is a code array composed of only bits "0." Since the pattern of the diagonal stroke falling from left to right represents a bit "0" in the present exemplary embodiment, an image representing the inhibition code array 0 only contains the patterns of the diagonal strokes falling from left to right. In such a configuration, inhibition information for inhibiting a predetermined processing is embedded by using the inhibition code array 0. In the case of a copying operation of an original document as an example of the predetermined processing, the inhibition information is information to be used for inhibiting copying of the original document.

FIG. 1B illustrates an image representing an inhibition code array 1. In the present case, the inhibition code array 1 is a code array composed of only bits "1." Since the pattern of the diagonal stroke rising from left to right represents a bit "1" in the present exemplary embodiment, an image representing the inhibition code array 1 only contains the patterns of the diagonal strokes rising from left to right. In such a configuration, inhibition information for inhibiting a predetermined processing is embedded by using the inhibition code array 1. In the case of a copying operation of an original document as an example of the predetermined processing, the inhibition information is information to be used for inhibiting copying of the original document.

In the meantime, FIG. 1C illustrates an image representing a condition code array. In the present case, the condition code array is composed of both bits "0" and bits "1." In the present exemplary embodiment, the pattern of the diagonal stroke falling from left to right represents a bit "0," while the pattern of the diagonal stroke rising from left to right represents a bit "1." Accordingly, the image representing the condition code array contains both the patterns of the diagonal strokes falling from left to right and the patterns of the diagonal strokes rising from left to right. In such a configuration, condition information indicating a condition for releasing an inhibition of a predetermined processing is embedded into the condition code array. In the case of a copying operation of an original document as an example of the predetermined processing, the condition information is information indicating a condition for releasing the inhibition of the copying operation of the original document. In such a case, a password, a user ID, date, a serial number of a copying apparatus and the like are exemplified as the condition information.

It should be noted that the inhibition information and the condition information may be hereinafter collectively referred to as "control information."

Figure 2:
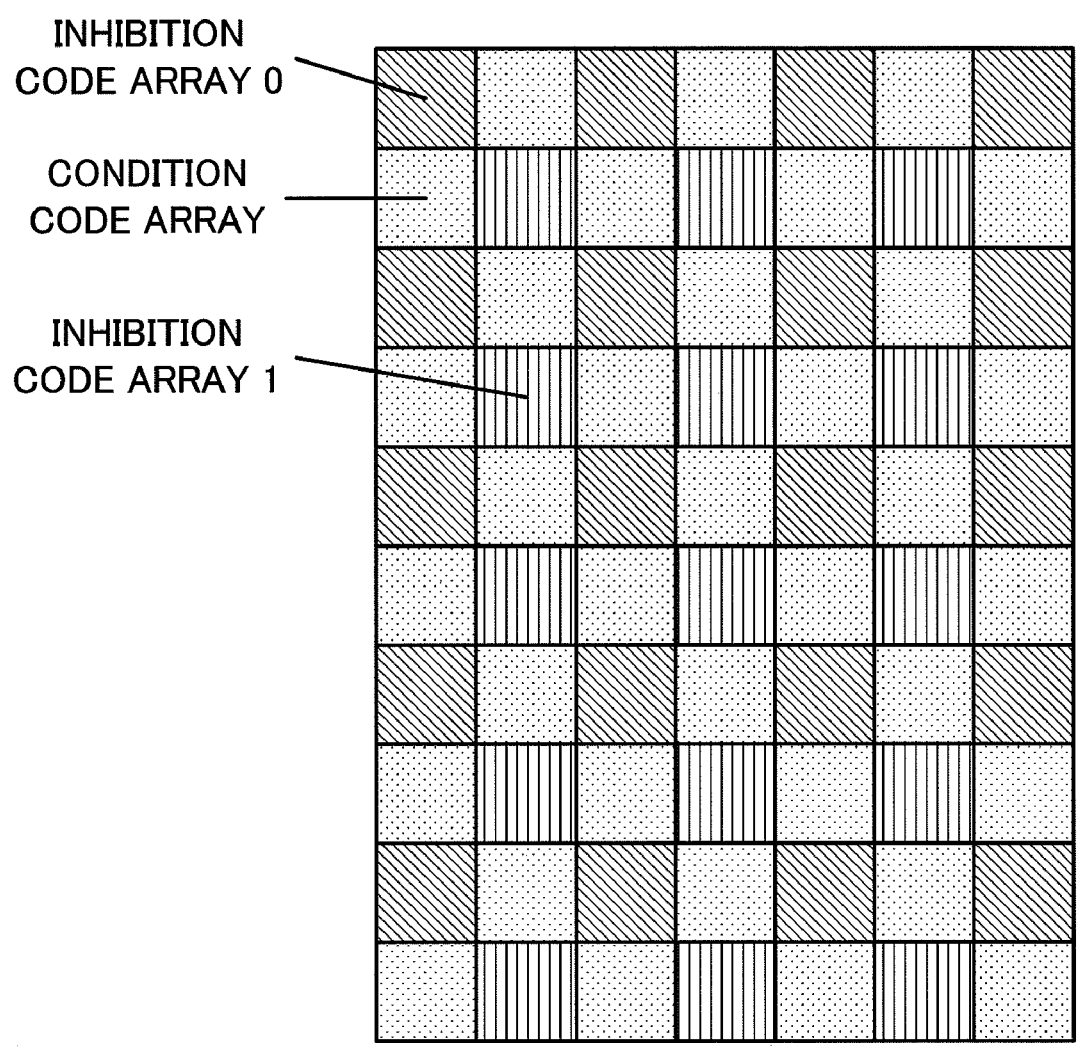
FIG. 2 is a diagram illustrating an example of a layout of the embedded image.

FIG. 2 is a diagram illustrating an example of a layout of the embedded image.

In the figure, a diagonally hatched rectangle represents a region into which the inhibition code array 0 illustrated in FIG. 1A is embedded (this region is hereinafter referred to as an "inhibition region 0"), a vertically hatched rectangle represents a region into which the inhibition code array 1 illustrated in FIG. 1B is embedded (this region is hereinafter referred to as an "inhibition region 1"), and a dot-hatched rectangle represents a region into which the condition code array illustrated in FIG. 1C is embedded (this region is hereinafter referred to as a "condition region"). Hereinafter, the inhibition region 0, the inhibition region 1 and the condition region may be collectively referred to as a "control region."

In this layout, for example, 20 pattern images both in a main scanning direction and in a sub scanning direction are arranged in each of the control regions.

In this case, the layout of the embedded image is not limited to that illustrated in FIG. 2. For example, the layout may include the inhibition regions 0 and the inhibition regions 1 that are alternately arranged both in the main scanning direction and in the sub scanning direction in the absence of the condition region.

In the present exemplary embodiment, as illustrated in FIGS. 1A to 1C, the control information is embedded into the embedded image by periodically arranging minute pixel clusters. In the meantime, in some cases, images detected as minute pixel clusters, such as halftone dots, may be included in a similar cycle as the pixel clusters of the control information in the document image that is printed out after the embedded image is superimposed on the document image. In such a case, the pixel clusters in the document image may be erroneously detected as the pixel clusters of the control information. As a result, even though the read-out original document is not a copy-inhibited document, an action for inhibiting a copying operation may be performed.

While pattern images each representing control information (hereinafter, such pattern images are individually referred to as a "code image") are supposed to be arranged with regularity as shown in FIGS. 1A to 1C, pixel clusters such as halftone dots are not generally arranged with such regularity.

Accordingly, in the present exemplary embodiment, by focusing on such difference in regularity of arrangement, if pixel clusters which are detected as pattern images are not arranged with certain regularity, they are not to be identified as code images. In the following section, exemplary embodiments will be each described for the regularity of individual arrangements that are focused on.

First Exemplary Embodiment

The first exemplary embodiment focuses on the fact that a rotation angle obtained on the basis of relative positions of two or more code images is supposed to be uniform throughout a predetermined region.

Figure 3:
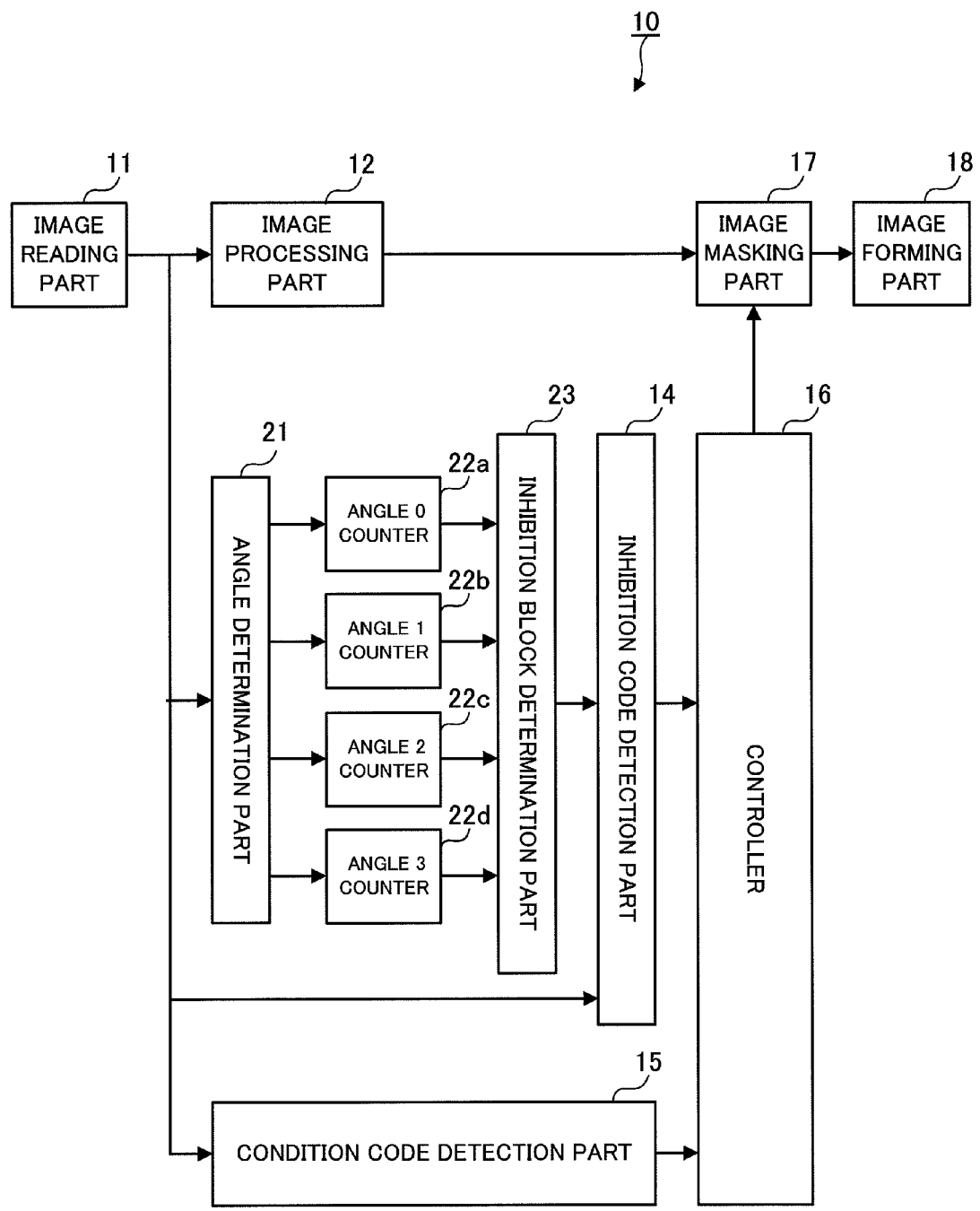
FIG. 3 is a block diagram illustrating a configuration example of the copying apparatus in the first exemplary embodiment.

FIG. 3 is a block diagram illustrating a configuration example of the copying apparatus 10 in the first exemplary embodiment.

As shown in the figure, the copying apparatus 10 is provided with an image reading part 11, an image processing part 12, an inhibition code detection part 14, a condition code detection part 15, a controller 16, an image masking part 17 and an image forming part 18. In addition, the copying apparatus 10 is provided with an angle determination part 21, an angle 0 counter 22$a$, an angle 1 counter 22$b$, an angle 2 counter 22$c$, an angle 3 counter 22$d$ and an inhibition block determination part 23.

The image reading part 11 obtains image data by, for example, reading out an image printed on an original document. In this case, the image reading part 11 is, for example, a scanner, and the scanner may have a charge coupled device (CCD) configuration or a contact image sensor (CIS) configuration. In the charge coupled device (CCD) configuration, a reflected light derived from a light emitted from a light source and illuminating an original document is reduced by a lens and then received by CCDs, while in the contact image sensor (CIS) configuration, a reflected light derived from a light emitted from each LED light source and sequentially illuminating an original document is received by a CIS. In the first exemplary embodiment, the image reading part 11 is provided as an example of a reading unit that reads out an image.

The image processing part 12 performs a predetermined image processing on image data inputted from the image reading part 11.

The inhibition code detection part 14 divides a code array represented by image data inputted from the image reading part 11 into blocks, and detects an inhibition code in a block, among the blocks, which has been determined to be subjected to the inhibition code detection. In the first exemplary embodiment, the inhibition code detection part 14 is provided as an example of a detection unit that detects a specified image.

The condition code detection part 15 divides a code array represented by image data inputted from the image reading part 11 into blocks, and detects a condition code in the blocks.

The controller 16 outputs a signal for instructing the image masking part 17 to, for example, paint over an image on the basis of output from the inhibition code detection part 14 and the condition code detection part 15. In the first exemplary embodiment, the controller 16 is provided as an example of a restriction unit that restricts printing of an image on other medium.

The image masking part 17 performs a processing for painting over the image which has been subjected to the image processing by the image processing part 12, when the signal for instructing to paint over the image is outputted from the controller 16.

The image forming part 18 forms an image on a recording medium, such as paper. In this case, the image forming part 18 is, for example, a printer, and the printer may uses an electrophotographic method in which an image is formed by transferring toner attached to a photoconductor to a recording medium, or an inkjet method in which an image is formed by ink jetting onto a recording medium.

The angle determination part 21 detects pattern images from image data inputted from the image reading part 11, and determines a rotation angle of the pattern image. In this case, the rotation angle is determined on the basis of relative positions of two or more code images. As a rotation angle, any one of angles 0 to 3 obtained by dividing 90 degrees by 4 is outputted. In the first exemplary embodiment, the angle determination part 21 is provided as an example of an angle determination unit that determines a rotation angle of a specified image.

The angle 0 counter 22*a* is a counter that counts the number of times the angle 0 is outputted from the angle determination part 21.

The angle 1 counter 22*b* is a counter that counts the number of times the angle 1 is outputted from the angle determination part 21.

The angle 2 counter 22*c* is a counter that counts the number of times the angle 2 is outputted from the angle determination part 21.

The angle 3 counter 22*d* is a counter that counts the number of times the angle 3 is outputted from the angle determination part 21.

The inhibition block determination part 23 determines whether or not a block is to be subjected to the inhibition code detection on the basis of the counted values of the angle 0 counter 22*a*, the angle 1 counter 22*b*, the angle 2 counter 22*c* and the angle 3 counter 22*d*, respectively. In the first exemplary embodiment, the inhibition block determination part 23 is provided as an example of a determination unit that determines whether or not a specified region is to be subjected to detection, and also as an example of a processing target determination unit that determines whether or not a specified region is to be subjected to a predetermined processing.

It should be noted that, although the first exemplary embodiment will be described on condition that it is determined whether or not a block is to be subjected to the inhibition code detection, the present invention is not limited to this. In other words, it may be determined whether or not a block is to be subjected to condition code detection. In such a case, it is recommended that the angle determination part 21, the angle 0 counter 22*a*, the angle 1 counter 22*b*, the angle 2 counter 22*c*, the angle 3 counter 22*d* and the inhibition block determination part 23 may be provided in a preceding portion of the condition code detection part 15.

In the following section, the operation of the copying apparatus 10 will be described.

In the copying apparatus 10, first, image data obtained as a result of reading of an original document image by the image reading part 11 is outputted to the image processing part 12, the angle determination part 21, the inhibition code detection part 14 and the condition code detection part 15.

Then, the image processing part 12 performs a predetermined image processing on the image data outputted from the image reading part 11, and outputs the image data to the image masking part 17.

The angle determination part 21 determines a rotation angle of individual pattern images contained in the image data outputted from the image reading part 11, and stores the individual results in the angle 0 counter 22*a*, the angle 1 counter 22*b*, the angle 2 counter 22*c* or the angle 3 counter 22*d*. Thereafter, on the basis of the counted values stored in these individual counters, the inhibition block determination part 23 outputs, to the inhibition code detection part 14, information indicating whether or not a block is to be subjected to the inhibition code detection. A detailed description will be given of this inhibition block determination processing later.

Then, the inhibition code detection part 14 detects an inhibition code from the image data outputted from the image reading part 11.

In this section, the operation of the inhibition code detection part 14 will be described.

Figure 4:
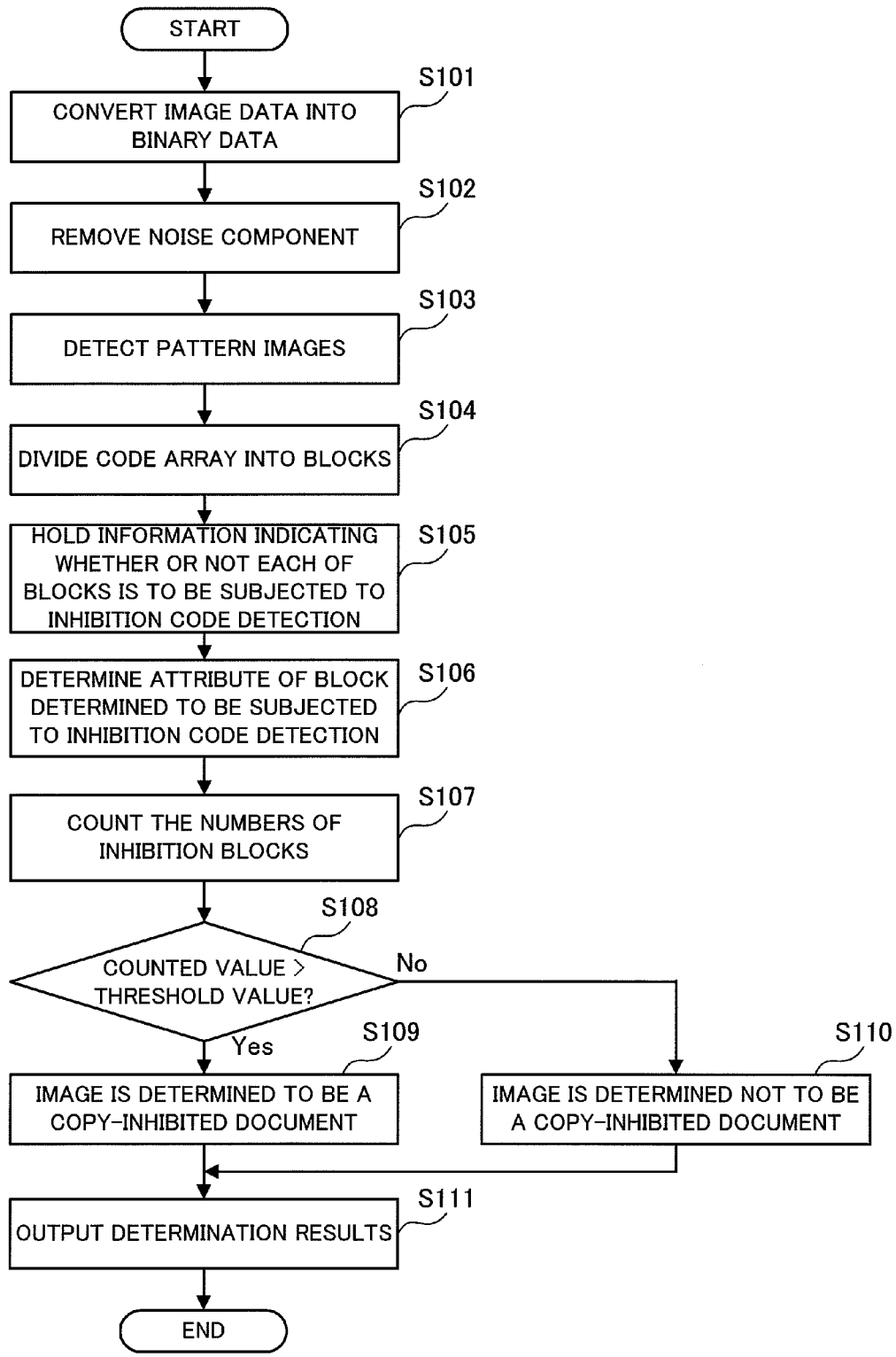
FIG. 4 is a flowchart illustrating an operation example of the inhibition code detection part.

FIG. 4 is a flowchart illustrating an operation example of the inhibition code detection part 14.

The inhibition code detection part 14 first converts image data inputted from the image reading part 11 into binary data of "0" or "1" (step 101). Then, a noise component included in the binary data is removed (step 102). In this step, for example, pixel clusters in each of which black pixels are connected each other are obtained. Then, each of the pixels in a pixel cluster, among the pixel clusters obtained as described above, having a size not in a predetermined size range is replaced with a white pixel. The predetermined range may be set to a range such that a diagonal pattern is not erased, and, for example, an isolated dot pattern is erased.

Next, the inhibition code detection part 14 detects two kinds of pattern images illustrated in FIGS. 1A to 1C in an image from which the noise has been removed, and replaces the individual pattern images with a bit "0" or a bit "1" to obtain a code array (step 103). For example, the pattern of the diagonal stroke falling from left to right and the pattern of the diagonal stroke rising from left to right, which each serve as a reference, are sequentially assigned to a position of each of the pixels in the image expressed by binary data, and a pattern image is detected by template matching. Then, in the case where the pattern images illustrated in FIGS. 1A to 1C are used, a bit "0" is outputted when the pattern of the diagonal stroke falling from left to right is detected, while a bit "1" is outputted when the pattern of the diagonal stroke rising from left to right is detected. It should be noted that a detailed description of a pattern image detection method by template matching is omitted since the method is based on a publicly-know technique.

Thereafter, the inhibition code detection part 14 divides the code array composed of bits "0" or bits "1" into small regions (blocks) each having a predetermined size (step 104). For example, the size of the individual blocks is set to a size smaller than half the size of the individual control regions so that one or more blocks are fully contained in each of the control regions.

The code array is divided into plural blocks as described above. In the first exemplary embodiment, the inhibition block determination part 23 determines, in a processing which will be described later, whether or not each of the blocks is to be subjected to the inhibition code detection, and then outputs the result of the determination to the inhibition code detection part 14. Then, in response to the determination result, the inhibition code detection part 14 holds information indicating whether or not each of the blocks is to be subjected to the inhibition code detection (step 105).

Further, the inhibition code detection part 14 determines an attribute of a block that has been determined to be subjected to the inhibition code detection in step 105 (step 106). The attribute of the block in this case indicates whether the block is an inhibition block 0 containing a large number of bits "0," an inhibition block 1 containing a large number of bits "1," or a condition block containing both bits "0" and bits "1." In this configuration, first, in the block that is to be subjected to the inhibition code detection, the numbers of bits "0" and bits "1" are respectively calculated, and a total sum of the numbers is also calculated. Then, on the basis of the ratio of bits "0" calculated from the number of bits "0" and the total sum, the attribute of the block is determined.

At this point, in the case where a target block is located inside of the inhibition area 0, the number of bits "0" detected in the block is equal to or more than a predetermined number, and a bit "1" is hardly detected. Accordingly, the ratio of bits "0" is high. When the ratio 100% to 0% is expressed as 1.0 to 0.0, respectively, the ratio of bits "0" should be very close to 1.0.

Further, in the case where a target block is located inside of the inhibition area 1, the number of bits "1" detected in the block is equal to or greater than a predetermined number and a bit "0" is hardly detected. Accordingly, the ratio of bits "0" is low and should be very close to 0.0.

Furthermore, in the case where a target block is located inside of the condition area, since plural bits "0" and plural bits "1" are detected in the block, the ratio of bits "0" should be much lower than 1.0 and much higher than 0.0.

In the case where the image data outputted from the image reading part 11 corresponds to an original document image into which control information is embedded, plural bits "0" and plural bits "1" should be embedded into the block.

The inhibition code detection part 14 determines the attribute of the block by using such characteristics in the following process:

1) In the case where the total number of the pattern images is greater than a threshold value Th1, and the ratio of bits "0" is greater than a threshold value Th2, the block belongs to the inhibition region 0.
2) In the case where the total number of the pattern images is greater than the threshold value Th1, and a value in which one (1) minus the ratio of bits "0" is greater than the threshold value Th2, the block belongs to the inhibition region 1.
3) In the case where neither 1) nor 2) is applicable, the block does not belong to any inhibition region.

The threshold value Th1 may be set by calculating the number of the pattern images theoretically included in the block on the basis of the size of the block and the size of the control region, and then by allowing for a margin for the number. The threshold value Th2 is set to a value close to 1.0 (for example, the threshold value Th2 is set to 0.95).

Next, the inhibition code detection part 14 counts the number of the inhibition blocks 0 and the number of the inhibition blocks 1 separately (step 107). Thereafter, these counted values are each compared to a threshold value Th3 (step 108). In this case, the threshold value Th3 may be adjusted accordingly depending on the number of the kinds of the inhibition codes.

As a result, in the case where the number of the inhibition blocks 0 is equal to or greater than the threshold value Th3, and the number of the inhibition blocks 1 is greater than the threshold value Th3, it is determined that the image is a copy-inhibited document (step 109). In the case other than the above case, it is determined that the image is not a copy-inhibited document (step 110). Then, the determination results are individually outputted to the controller 16 (step 111).

In the meantime, the condition code detection part 15 detects a condition code in the image data outputted from the image reading part 11.

Incidentally, the condition code detection processing is the same as the inhibition code detection processing except for the following points.

As a first point, it is necessary to consider a skew angle during reading of an original document while a condition code is being detected. If the original document has been rotated by 90 degrees, the pattern of the diagonal stroke falling from left to right corresponding to a bit "0" is detected as the pattern of the diagonal stroke rising from left to right corresponding to a bit "1," while the pattern of the diagonal stroke rising from left to right corresponding to a bit "1" is detected as the pattern of the diagonal stroke falling from left to right corresponding to a bit "0." Accordingly, even if a bit "0" and a bit "1" are reversed to each other, the determination whether or not the document is a copy-inhibited document does not be affected. However, when the condition code is to be detected, erroneous information may be extracted if it is not accurately determined whether each of the pattern images represents a bit "0" or a bit "1."

As a second point, error correcting encoding is performed on the condition code in order to avoid an erroneous operation due to extraction of wrong information. Accordingly, it is necessary to perform an error correcting decoding processing for detection of the condition code.

As described above, in accordance with output from the inhibition code detection part 14, the controller 16 outputs, to the image masking part 17, a signal instructing to paint over the image when the original document is a copy-inhibited document, and a signal instructing to perform a regular copying operation without painting over the image when the original document is not a copy-inhibited document. The controller 16 may also output, to the image forming part 18, a signal instructing to terminate the copying operation when the original document is a copy-inhibited document. The controller 16 may also output a signal instructing to perform the copying operation if a predetermined condition is satisfied, in accordance with output from the condition code detection part 15.

In the following section, a description will be given of the inhibition block determination processing performed by the angle determination part 21 and the inhibition block determination part 23.

FIG. 5 is a flowchart illustrating an operation example during the inhibition block determination processing. Prior to this operation example, it is assumed that the angle determination part 21 detects a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the first exemplary embodiment, the angle determination part 21 is provided as an example of a detection unit that detects a specified image.

Once the operation is initiated, the angle determination part 21 firstly performs an angle determination processing in order to determine a rotation angle of a pattern image (step 201). This angle determination processing will be described in detail later.

Thereafter, the angle determination part 21 determines whether or not the rotation angle is the angle 0 (step 202). If the rotation angle is the angle 0, one (1) is added to the angle 0 counter 22*a* (step 203). If the rotation angle is not the angle 0, it is determined whether or not the rotation angle is the angle 1 (step 204). If the rotation angle is the angle 1, 1 is added to the angle 1 counter 22*b* (step 205). If the rotation angle is not the angle 1, it is determined whether or not the rotation angle is the angle 2 (step 206). If the rotation angle is the angle 2, 1 is added to the angle 2 counter 22*c* (step 207). Furthermore, if the rotation angle is not the angle 2, it is determined whether or not the rotation angle is the angle 3 (step 208). The rotation angle is the angle 3, 1 is added to the angle 3 counter 22*d* (step 209). On the other hand, if the rotation angle is not the angle 3, 1 is not added to any counter, and the operation proceeds to step 210.

Thereafter, the angle determination part 21 determines whether or not a rotation angle has been calculated for every pattern image located within the block (step 210). At this point, if it is determined that a rotation angle has not been calculated for every pattern image, the operation goes back to step 201, and the same processing is performed on the next pattern image. On the other hand, if it is determined that a rotation angle has been calculated for every pattern image, the operation proceeds to the inhibition block determination processing.

In the inhibition block determination processing, the inhibition block determination part 23 firstly determines whether or not the number of counters, among the angle 0 counter 22*a*, the angle 1 counter 22*b*, the angle 2 counter 22*c* and the angle 3 counter 22*d*, in each of which a counted value greater than a threshold value TH_high1 is satisfied is one (step 211).

As a result, if it is determined that the number of counters in each of which the counted value greater than the threshold value TH_high1 is satisfied is one, it is then determined whether or not the number of counters in each of which a counted value less than a threshold value TH_low1 is satisfied is three (step 212). Then, if it is determined that the number of counters in each of which the counted value less than the threshold value TH_low1 is satisfied is not three, the rotation angle Ang of the target block is set to an angle 4 (step 213). In this case, the angle 4 is information indicating that a certain angle may not be specified as a rotation angle of a block due to the presence of pixel clusters other than code images within the block. On the other hand, if it is determined that the number of counters in each of which the counted value less than the threshold value TH_low1 is satisfied is three, the processing is terminated without setting a specific angle for Ang.

On the other hand, if it is determined that the number of counters in each of which the counted value greater than the threshold value TH_high1 is satisfied is not one, it is then determined whether or not the counters in each of which the counted value greater than a threshold value TH_high2 is satisfied are counters corresponding to two angles adjacent to each other (step 214). In this case, "angles adjacent to each other" refers in principle to the case where a difference between the angle numbers is one (1); however, the angle 0 and the angle 3 are also defined as angles adjacent to each other. If it is determined that the counters in each of which the counted value greater than the threshold value TH_high2 is satisfied are not counters corresponding to two angles adjacent to each other, the rotation angle Ang of the target block is set to the angle 4 (step 216). In this case, the angle 4 is, as described above, information indicating that a certain angle may not be specified as a rotation angle of a block. If it is determined that the counters in each of which the counted value greater than the threshold value TH_high2 is satisfied are counters corresponding to two angles adjacent to each other, it is then determined whether or not the number of counters in each of which a counted value less than a threshold value TH_low2 is satisfied is two (step 215). If it is determined that the number of counters in each of which the counted value less than the threshold value TH_low2 is satisfied is not two, the rotation angle Ang of the target block is set to the angle 4 (step 216). On the other hand, if it is determined that the number of counters in each of which the counted value less than the threshold value TH_low2 is satisfied is two, the processing is terminated without setting a specific value for Ang.

In the following section, a detail description will be given of the angle determination processing performed in step 201 in FIG. 5.

Figure 6A:
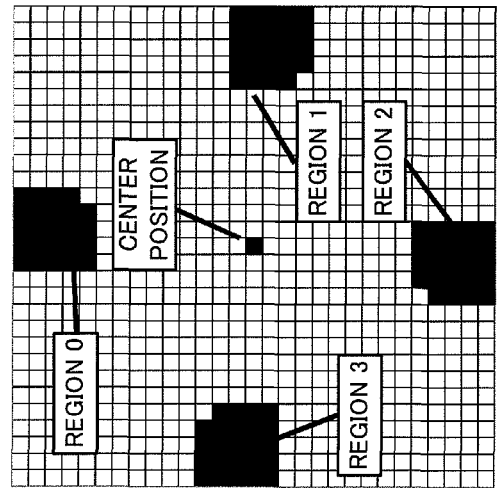
FIG. 6A shows an angle 0 determination window used in this angle determination processing.
Figure 6B:
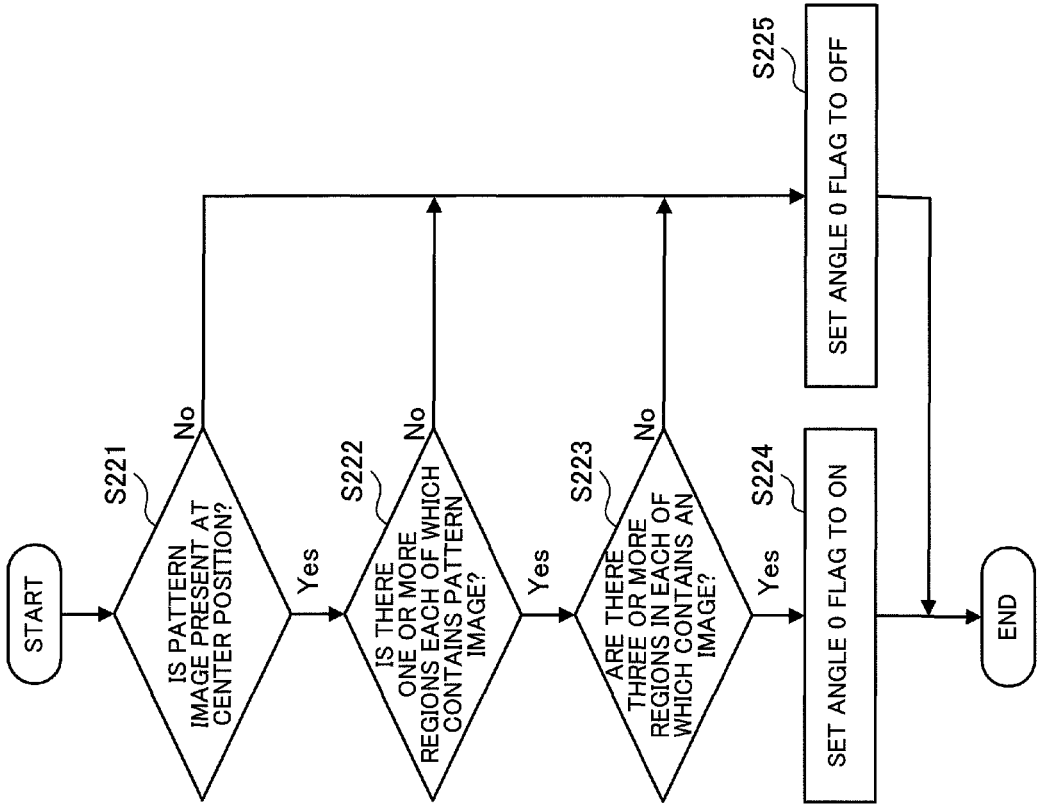
FIG. 6B is a flowchart illustrating an operation example of the angle determination part.

FIG. 6A shows an angle 0 determination window used in this angle determination processing. FIG. 6B is a flowchart illustrating an operation example of the angle determination part 21.

In this section, the angle 0 determination window illustrated in FIG. 6A will be described.

In this angle 0 determination window, in the case where a skew angle of an image that is read out by the image reading part 11 is 0 degree, and the center of the code image is present at the center position of the window, positions where code images adjacent to the code image are supposed to be present are shown as a region 0, a region 1, a region 2 and a region 3, respectively.

In the following section, the operation example in FIG. 6B will be described.

Once the operation is initiated, the angle determination part 21 firstly determines whether or not a pattern image is present at the center position of the angle 0 determination window by superimposing the angle 0 determination window on a certain position of the pattern center data (step 221). If the pattern image is present at the center position, it is determined whether or not there is one or more regions each of which contains a pattern image, among the regions 0 to 3 (step 222).

If there are one or more regions each containing the pattern image, it is determined whether or not there are three or more regions in each of which contains an image, among the regions 0 to 3 (step 223). In this case, the image refers not only to a code image but also to a regular image, such as letters and lines. In other words, the angle determination part 21 performs this determination operation by superimposing the angle 0 determination window on the same position in the image data inputted from the image reading part 11. If the result suggests that there are three or more regions each containing the image, an angle 0 flag is set to ON (step 224).

On the other hand, in the cases where it is determined that no pattern image is present at the center position in step 221, where it is determined that there is not one or more regions each containing the pattern image in step 222, and where it is determined that there are not three or more regions each containing the image in step 223, the angle 0 flag is set to OFF (step 225).

It should be noted that, since only two of the regions 0 to 3 may contain the code image on an edge of a medium, it may be determined whether or not there are two or more regions each containing an image in step 223. Alternatively, in case of providing a tighter condition, it may be determined whether or not there are four or more regions each containing an image.

The angle determination processing described above is for the angle 0, and the same processing is also performed for the angles 1 to 3. To be more specific, for the angle 1, an angle 1 flag is set to either ON or OFF by using an angle 1 determination window (refer to FIG. 7). Further, for the angle 2, an angle 2 flag is set to either ON or OFF by using an angle 2 determination window (refer to FIG. 7). Furthermore, for the angle 3, an angle 3 flag is set to either ON or OFF by using an angle 3 determination window (refer to FIG. 7).

In the following section, a description will be given of a method for determining an angle on the basis of each angle flag having been set to either ON or OFF as described above.

Figure 7:
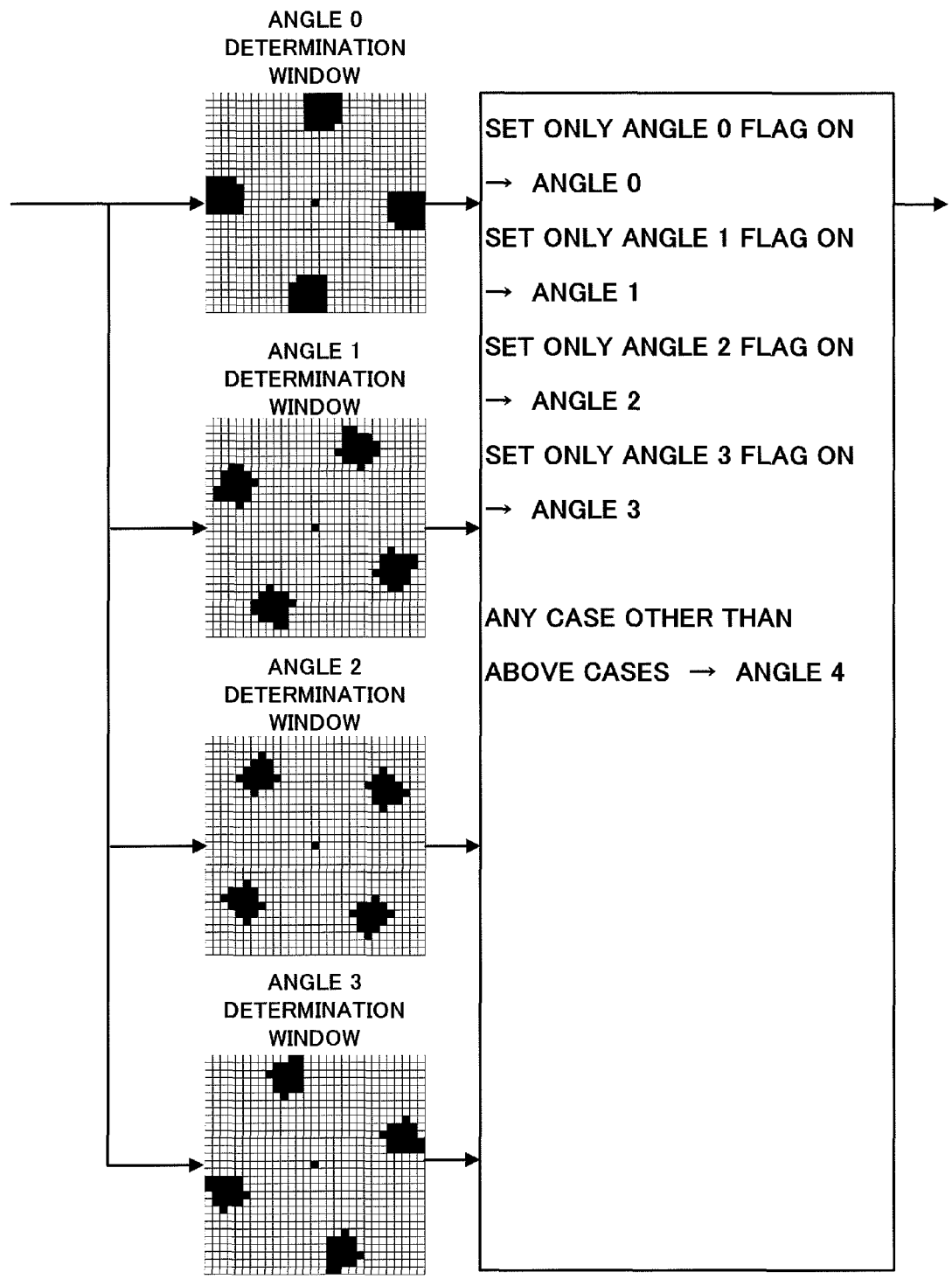
FIG. 7 is a diagram schematically illustrating the angle determination method in the present case.

FIG. 7 is a diagram schematically illustrating the angle determination method in the present case.

As shown in the figure, the angle 0 is outputted in the case where only the angle 0 flag is set to ON, or the angle 1 is outputted in the case where only the angle 1 flag is set to ON. Likewise, the angle 2 is outputted in the case where only the angle 2 flag is set to ON, and the angle 3 is outputted in the case where only the angle 3 flag is set to ON. On the other hand, in any case other than the above cases, the angle 4 is outputted.

In FIG. 7, it is shown that the regions 0 to 3 are not overlapped with each other in the angle 0 determination window, the angle 1 determination window, the angle 2 determination window and the angle 3 determination window. However, the regions 0 to 3 in one determination window may be partially overlapped with the regions 0 to 3 in a different determination window. For example, some parts of the regions 0 to 3 in the angle 0 determination window and those in the angle 1 determination window may occupy the same areas. In addition, although there are 4 kinds of angles in the first exemplary embodiment, two kinds of angles may be accepted as the minimum number. On the contrary, more than 4 kinds of angles may be accepted.

In the next section, a description will be given of a method for determining an inhibition block on the basis of counter values of the angle 0 counter 22*a*, the angle 1 counter 22*b*, the angle 2 counter 22*c*, and the angle 3 counter 22*d*.

Figure 8:
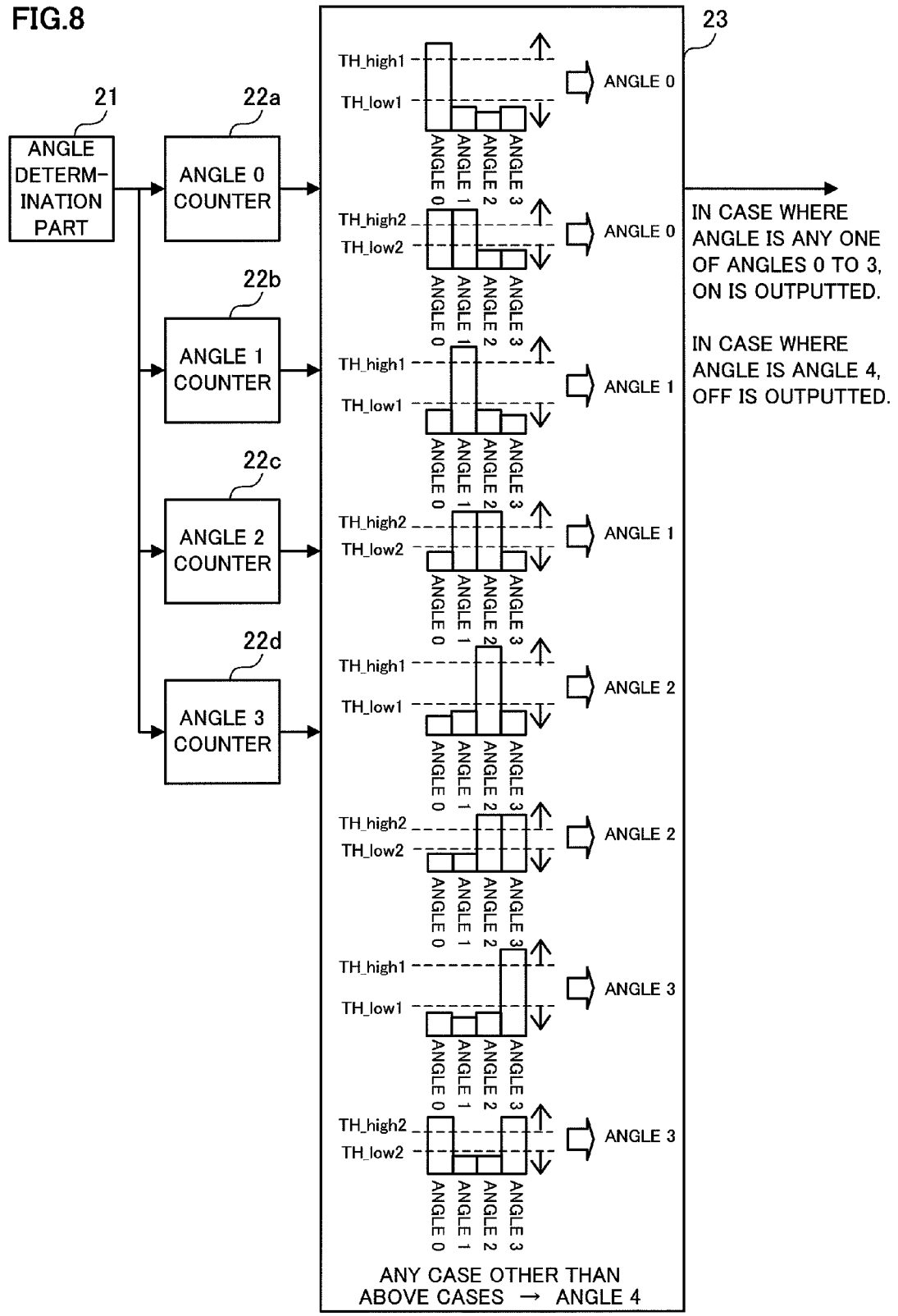
FIG. 8 is a diagram schematically illustrating the inhibition block determination method in the present case.

FIG. 8 is a diagram schematically illustrating the inhibition block determination method in the present case.

As shown in the figure, the counted values of the angle 0 counter 22*a*, the angle 1 counter 22*b*, the angle 2 counter 22*c*, and the angle 3 counter 22*d* are shown as a histogram, and a rotation angle of a pattern image in a block is determined on the basis of the distribution state of the histogram.

For example, in the case, as shown in the first, third, fifth and seventh histograms from the top, where a counted value of one angle is greater than the threshold value TH_high1, and counted values of other three angles are less than the threshold value TH_low1, the one angle is adopted as the rotation angle of the block. In the meantime, in the case, as shown in the second, fourth, sixth and eighth histograms from the top, where counted values of two angles adjacent to each other are each greater than the threshold value TH_high2, and counter values of the other two angles are each less than the threshold value TH_low2, any one of the two angles adjacent to each other is adopted as the rotation angle of the block. In this case, the angle having a smaller number between the angles adjacent to each other is adopted (however, in the case of the angle 0 and the angle 3, the angle 3 is adopted). It should be noted that the rotation angle Ang is not set to any specific angle in these cases.

Meanwhile, in any case other than these cases described above, the rotation angle Ang is set to the angle 4.

Thereafter, in the case where the rotation angle of the block is any one of the angles 0 to 3, and no specific angle is set for Ang, it is determined that the target block is a block containing a code image. In such a case, the inhibition block determination part 23 outputs ON. As a result, information contained in the block is used in the inhibition code detection part 14.

On the other hand, in the case where the rotation angle Ang of the block is the angle 4, it is determined that the target block is not a block containing a code image. In such a case, the inhibition block determination part 23 outputs OFF. As a result, information contained in the block is excluded from being subjected to detection, in the inhibition code detection part 14.

In the following section, a description will be given of a method for selecting a block to be subjected to the inhibition block determination.

Figure 9:
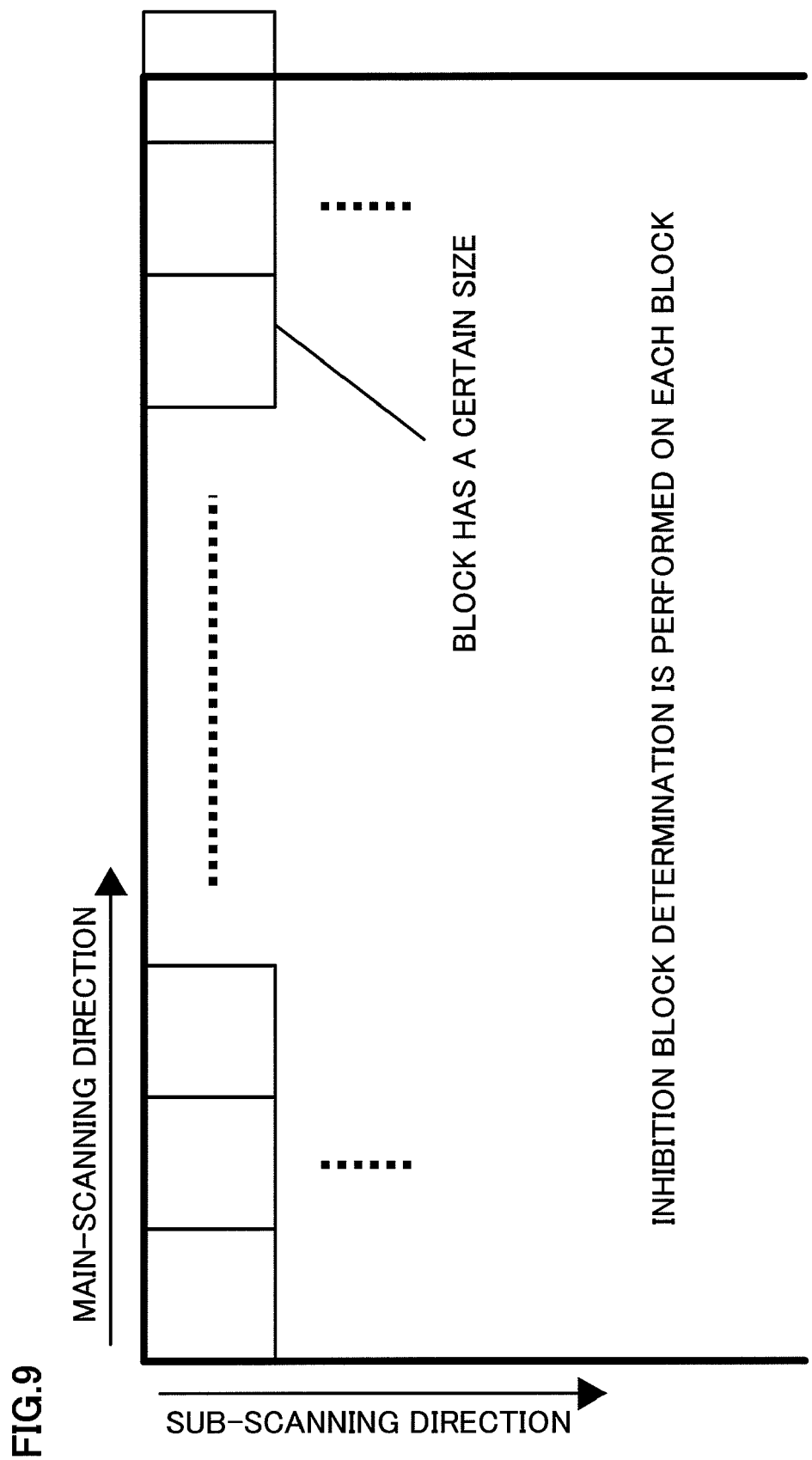
FIG. 9 is a diagram for explaining the block selection method.

FIG. 9 is a diagram for explaining the block selection method.

As shown in the figure, a code array is divided, in a main scanning direction, into blocks each having a certain size, and the above-described processing is performed on each of the blocks. As a result, each of the blocks is to be determined whether or not it is the inhibition block.

Second Exemplary Embodiment

The second exemplary embodiment focuses on the fact that a rotation angle obtained by a method based on relative positions of two or more code images is supposed to correspond to a rotation angle obtained by other method.

Figure 10:
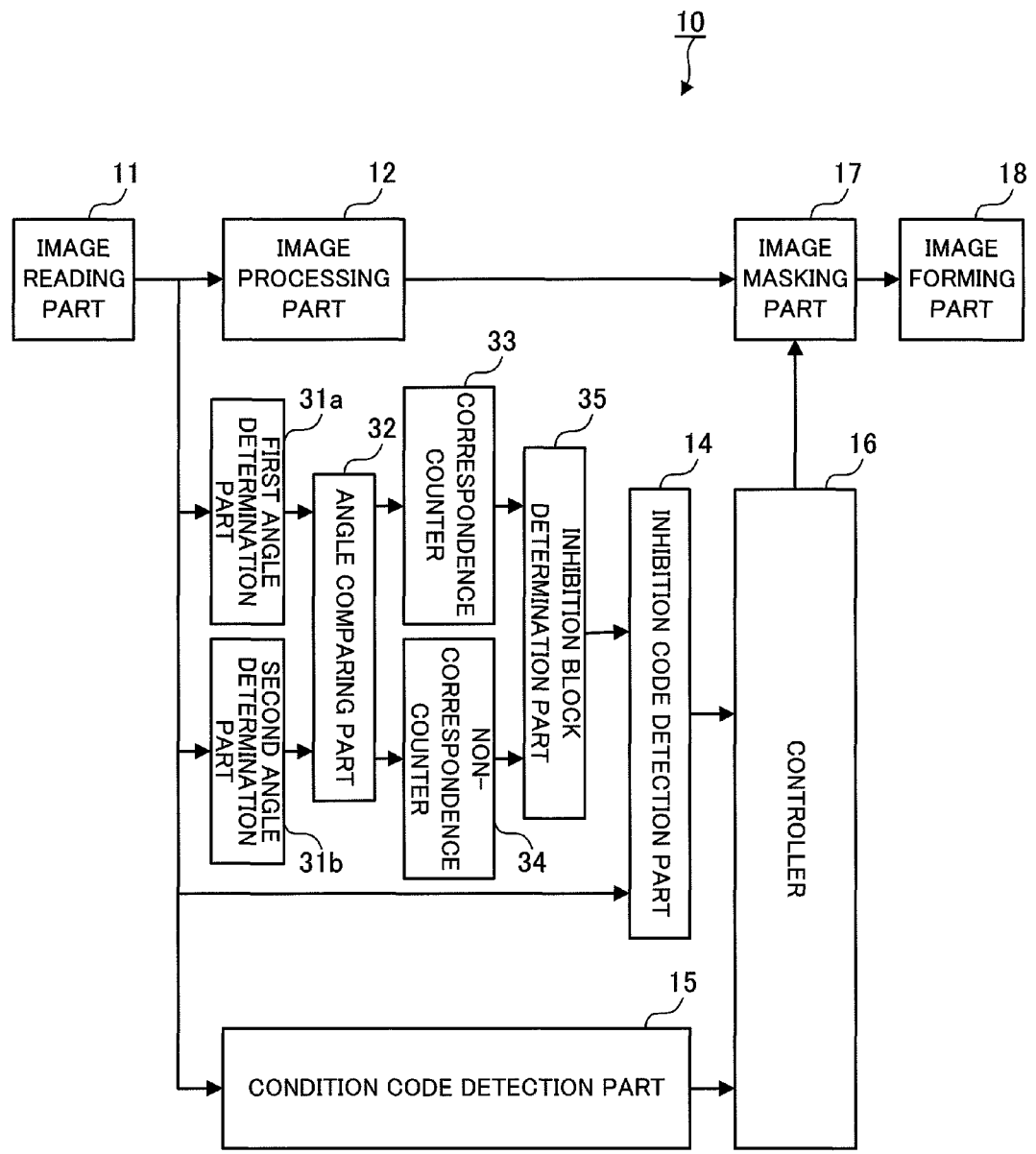
FIG. 10 is a block diagram illustrating a configuration example of the copying apparatus in the second exemplary embodiment.

FIG. 10 is a block diagram illustrating a configuration example of the copying apparatus 10 in the second exemplary embodiment.

As shown in the figure, the copying apparatus 10 is provided with the image reading part 11, the image processing part 12, the inhibition code detection part 14, the condition code detection part 15, the controller 16, the image masking part 17 and the image forming part 18. In addition, the copying apparatus 10 is provided with a first angle determination part 31*a*, a second angle determination part 31*b*, an angle comparing part 32, a correspondence counter 33, a non-correspondence counter 34 and an inhibition block determination part 35.

Since a description has been given of the image reading part 11, the image processing part 12, the inhibition code detection part 14, the condition code detection part 15, the controller 16, the image masking part 17 and the image forming part 18 among them in the first exemplary embodiment, a detail description thereof is omitted here.

The first angle determination part 31a detects a pattern image from image data inputted from the image reading part 11, and determines a rotation angle of the pattern image by a first method. The first method in this case is a determination method based on relative positions of two or more code images. For example, as described in the first exemplary embodiment, a determination method using an angle determination window may be adopted. In the second exemplary embodiment, the first angle determination part 31a is provided as an example of a first angle determination unit that determines a rotation angle of a specified image by a first method.

The second angle determination part 31b detects the pattern image from the image data inputted from the image reading part 11, and determines a rotation angle of the pattern image by a second method. As the second method in this case, for example, a pattern matching method may be adopted. Since the pattern matching method for determining a rotation angle is a publicly-known technique, a detailed description is omitted. Alternatively, other method may be adopted as the second method. In particular, a determination method based on relative positions of code images that is similar to the one adopted in the first angle determination part 31a may be adopted, but the method is different from the one adopted in the first angle determination part 31a. In the second exemplary embodiment, the second angle determination part 31b is provided as an example of a second angle determination unit that determines a rotation angle of a specified image by the second method.

The angle comparing part 32 determines whether or not the rotation angle determined by the first angle determination part 31a corresponds to the rotation angle determined by the second angle determination part 31b, and outputs the result of the determination.

The correspondence counter 33 is a counter that counts the number of times the information indicating that two rotation angles correspond to each other is outputted from the angle comparing part 32.

The non-correspondence counter 34 is a counter that counts the number of times the information indicating that two rotation angles do not correspond to each other is outputted from the angle comparing part 32.

The inhibition block determination part 35 determines whether or not a block is to be subjected to the inhibition code detection on the basis of the respective counted values of the correspondence counter 33 and the non-correspondence counter 34. In the second exemplary embodiment, the inhibition block determination part 35 is provided as an example of a determination unit that determines whether or not a specified region is to be subjected to detection, and also as an example of a processing target determination unit that determines whether or not a specified region is to be subjected to a predetermined processing.

It should be noted that, although the second exemplary embodiment will be described on condition that it is determined whether or not a block is to be subjected to the inhibition code detection, the present invention is not limited to this. In other words, it may be determined whether or not a block is to be subjected to condition code detection. In such a case, it is recommended that the first angle determination part 31a, the second angle determination part 31b, the angle comparing part 32, the correspondence counter 33, the non-correspondence counter 34 and the inhibition block determination part 35 may be provided in a preceding portion of the condition code detection part 15.

In the following section, the operation of the copying apparatus 10 will be described. The operation of the image reading part 11, the image processing part 12, the inhibition code detection part 14, the condition code detection part 15, the controller 16, the image masking part 17 and the image forming part 18 has been described in the first exemplary embodiment; thus, the following section will provide a description of the inhibition block determination processing by the first angle determination part 31a, the second angle determination part 31b, the angle comparing part 32 and the inhibition block determination part 35.

Figure 11:
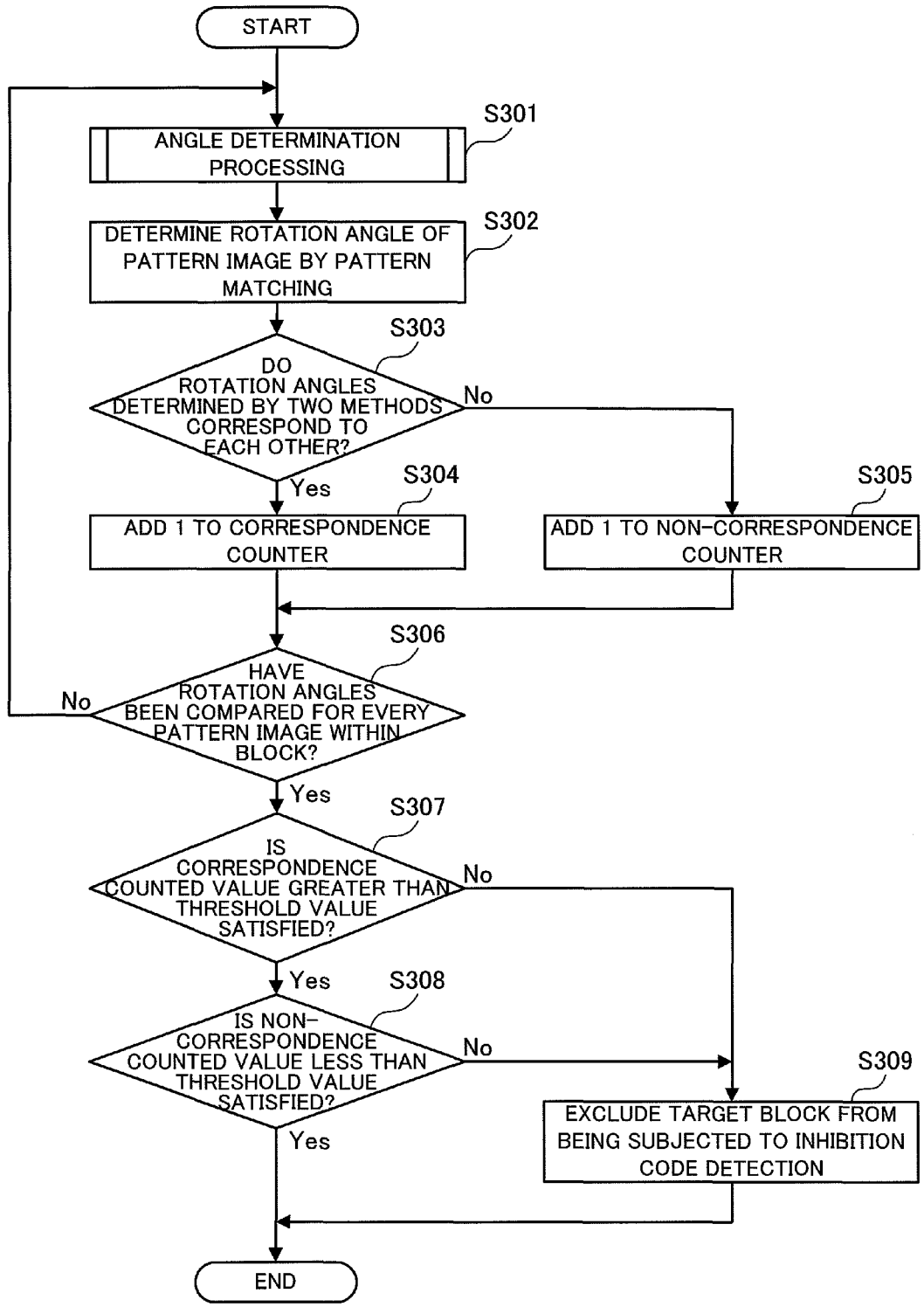
FIG. 11 is a flowchart illustrating another operation example during the inhibition block determination processing.

FIG. 11 is a flowchart illustrating another operation example during the inhibition block determination processing. Prior to this operation example, it is assumed that the first angle determination part 31a and the second angle determination part 31b detect a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the second exemplary embodiment, the first angle determination part 31a and the second angle determination part 31b are provided as an example of a detection unit that detects a specified image.

Once the operation is initiated, the first angle determination part 31a performs an angle determination processing for determining a rotation angle of a pattern image (step 301). Since the angle determination processing has been described in detail in the first exemplary embodiment, further description will not be provided. Next, the second angle determination part 31b determines a rotation angle of the pattern image by, for example, the pattern matching (step 302). It should be noted that, in this case, for descriptive purposes, the first angle determination part 31a performs the determination, followed by the second angle determination part 31b. Alternatively, the second angle determination part 31b may perform the determination, followed by the first angle determination part 31a, or the first angle determination part 31a and the second angle determination part 31b may perform the determination in parallel processing at the substantially same time.

The unit of the rotation angle obtained in this processing may be an angle obtained by dividing 90 degrees by at least two. The number for dividing the angle (a used angle obtained by dividing 90 degrees by the number) may vary between rotation angles obtained by the first angle determination part 31a and the second angle determination part 31b.

Next, the angle comparing part 32 determines whether or not the rotation angles determined by these two methods correspond to each other (step 303). If the rotation angles correspond to each other, one (1) is added to the correspondence counter 33 (step 304). If the rotation angles do not correspond to each other, one (1) is added to the non-correspondence counter 34 (step 305). It should be noted that the expression "correspondence" has been used for descriptive purposes. Accordingly, a certain range may be set for the angles which are determined to "correspond" to each other. In other words, even if angles do not completely correspond to each other, but the angles are within a certain range for approximation, the angles may be determined to "correspond" to each other. For example, in the case where one angle is adjacent to the other angle, these angles may be determined to "correspond" to each other.

Thereafter, the angle comparing part 32 determines whether or not rotation angles have been compared for every pattern image within the block (step 306). If it is determined that the rotation angles have not been compared for every pattern image, the operation goes back to step 301, and the same processing is repeated for the next pattern image. On the other hand, if it is determined that the rotation angles have been compared for every pattern image, the operation proceeds to the inhibition block determination processing.

In the inhibition block determination processing, the inhibition block determination part 35 firstly determines whether or not a counted value of the correspondence counter 33, which is expressed as a correspondence counted value, greater than a threshold value TH_high is satisfied (step 307).

As a result, if it is determined that the correspondence counted value greater than the threshold value TH_high is not satisfied, the block is excluded from being subjected to the inhibition code detection (step 309).

On the other hand, if it is determined that the correspondence counted value greater than the threshold value TH_high is satisfied, it is then determined whether or not a counted value of the non-correspondence counter 34, which is expressed as a non-correspondence counted value, less than a threshold value TH_low is satisfied (step 308).

As a result, if it is determined that the non-correspondence counted value less than the threshold value TH_low is not satisfied, the block is excluded from being subjected to the inhibition code detection (step 309).

On the other hand, if it is determined that the non-correspondence counted value less than the threshold value TH_low is satisfied, the processing is terminated with no further action. This is because, in the second exemplary embodiment, it is configured that each of the blocks is subjected to the inhibition code detection unless information indicating that the target block is excluded from being subjected to the inhibition code detection is outputted to the inhibition code detection part 14.

Third Exemplary Embodiment

The third exemplary embodiment also focuses on the fact that a rotation angle obtained by a method based on relative positions of two or more code images is supposed to correspond to a rotation angle obtained by other method.

Figure 12:
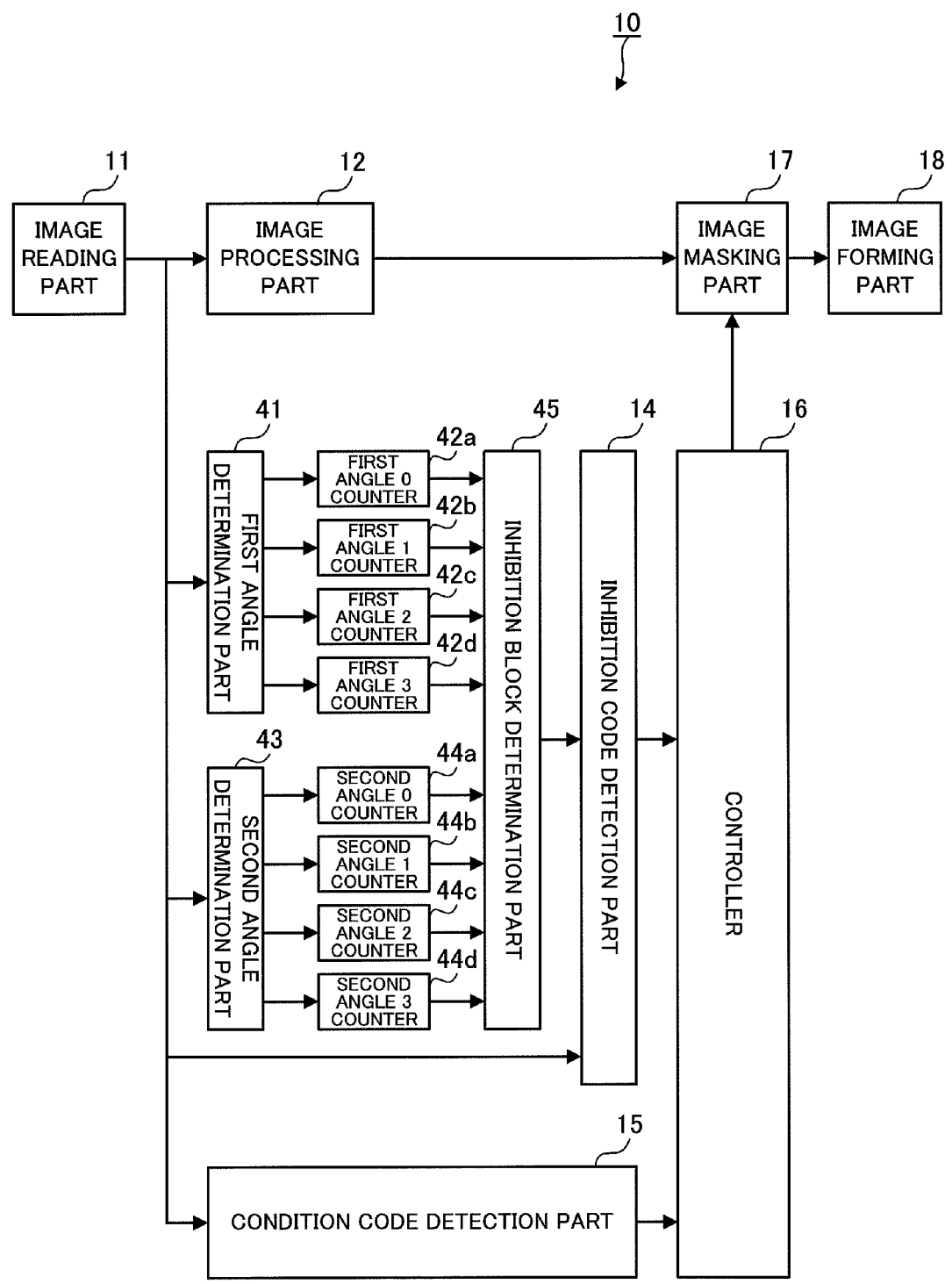
FIG. 12 is a block diagram illustrating a configuration example of the copying apparatus in the third exemplary embodiment.

FIG. 12 is a block diagram illustrating a configuration example of the copying apparatus 10 in the third exemplary embodiment.

As shown in the figure, the copying apparatus 10 is provided with the image reading part 11, the image processing part 12, the inhibition code detection part 14, the condition code detection part 15, the controller 16, the image masking part 17 and the image forming part 18. In addition, the copying apparatus 10 is provided with a first angle determination part 41, a first angle 0 counter 42a, a first angle 1 counter 42b, a first angle 2 counter 42c, a first angle 3 counter 42d, a second angle determination part 43, a second angle 0 counter 44a, a second angle 1 counter 44b, a second angle 2 counter 44c, a second angle 3 counter 44d and a inhibition block determination part 45.

Since a description has been given of the image reading part 11, the image processing part 12, the inhibition code detection part 14, the condition code detection part 15, the controller 16, the image masking part 17 and the image forming part 18 among them in the first exemplary embodiment, a detail description thereof is omitted here.

The first angle determination part 41 detects pattern images from image data inputted from the image reading part 11, and determines a rotation angle of the pattern image by using a first method. In this case, as the first method, a determination method on the basis of relative positions of two or more code images is used. For example, as described in the first exemplary embodiment, a determination method using an angle determination window may be adopted. As a rotation angle, any one of angles 0 to 3 obtained by dividing 90 degrees by 4 is outputted. In the third exemplary embodiment, the first angle determination part 41 is provided as an example of an angle determination unit that determines a rotation angle of a specified image.

The first angle 0 counter 42a is a counter that counts the number of times the angle 0 is outputted from the first angle determination part 41.

The first angle 1 counter 42b is a counter that counts the number of times the angle 1 is outputted from the first angle determination part 41.

The first angle 2 counter 42c is a counter that counts the number of times the angle 2 is outputted from the first angle determination part 41.

The first angle 3 counter 42d is a counter that counts the number of times the angle 3 is outputted from the first angle determination part 41.

The second angle determination part 43 detects pattern images from image data inputted from the image reading part 11, and determines a rotation angle of the pattern image by using a second method. As the second method in this case, for example, a pattern matching method may be adopted. Since the pattern matching method for determining a rotation angle is a publicly-known technique, a detailed description is omitted. Alternatively, other method may be adopted as the second method. In particular, a determination method based on relative positions of code images that is similar to the one adopted in the first angle determination part 41 may be adopted, but the method is different from the one adopted in the first angle determination part 41. As a rotation angle, any one of angles 0 to 3 obtained by dividing 90 degrees by 4 is outputted.

The second angle 0 counter 44a is a counter that counts the number of times the angle 0 is outputted from the second angle determination part 43.

The second angle 1 counter 44b is a counter that counts the number of times the angle 1 is outputted from the second angle determination part 43.

The second angle 2 counter 44c is a counter that counts the number of times the angle 2 is outputted from the second angle determination part 43.

The second angle 3 counter 44d is a counter that counts the number of times the angle 3 is outputted from the second angle determination part 43.

The inhibition block determination part 45 determines whether or not a block is to be subjected to the inhibition code detection on the basis of the counted values of the first angle 0 counter 42a, the first angle 1 counter 42b, the first angle 2 counter 42c, the first angle 3 counter 42d, the second angle 0 counter 44a, the second angle 1 counter 44b, the second angle 2 counter 44c and the second angle 3 counter 44d, respectively. In the third exemplary embodiment, the inhibition block determination part 45 is provided as an example of a determination unit that determines whether or not a specified region is to be subjected to detection, and also as an example of a processing target determination unit that determines whether or not a specified region is to be subjected to a predetermined processing.

It should be noted that, although the third exemplary embodiment will be described on condition that it is determined whether or not a block is to be subjected to the inhibition code detection, the present invention is not limited to this. In other words, it may be determined whether or not a block is to be subjected to condition code detection. In such a case, it is recommended that the first angle determination part 41, the first angle 0 counter 42a, the first angle 1 counter 42b, the first angle 2 counter 42c, the first angle 3 counter 42d, the second angle determination part 43, the second angle 0 counter 44a, the second angle 1 counter 44b, the second angle 2 counter 44c, the second angle 3 counter 44d and the inhibition block determination part 45 may be provided in a preceding portion of the condition code detection part 15.

In the following section, the operation of the copying apparatus 10 will be described. The operation of the image reading part 11, the image processing part 12, the inhibition code detection part 14, the condition code detection part 15, the controller 16, the image masking part 17 and the image forming part 18 has been described in the first exemplary embodiment; thus, the following section will provide a description of the inhibition block determination processing by the first angle determination part 41, the second angle determination part 43 and the inhibition block determination part 45.

Figure 13:
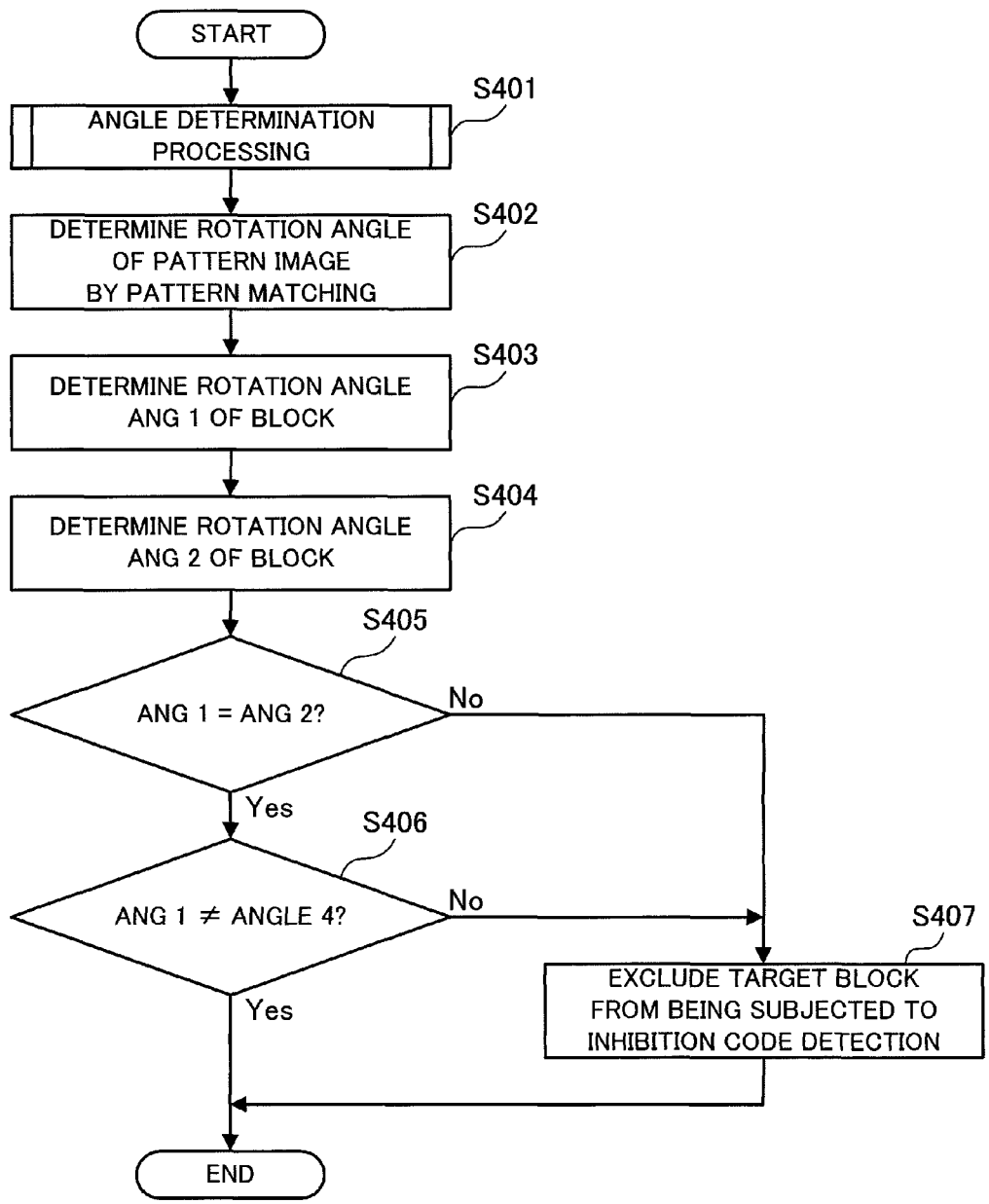
FIG. 13 is a flowchart illustrating a further operation example during the inhibition block determination processing.

FIG. 13 is a flowchart illustrating a further operation example during the inhibition block determination processing. Prior to this operation example, it is assumed that the first angle determination part 41 and the second angle determination part 43 detect a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the third exemplary embodiment, the first angle determination part 41 and the second angle determination part 43 are provided as an example of a detection unit that detects a specified image.

Once the operation is initiated, the first angle determination part 41 performs an angle determination processing for determining a rotation angle of a pattern image (step 401). Since the angle determination processing has been described in detail in the first exemplary embodiment, further description will not be provided.

Next, the second angle determination part 43 determines a rotation angle of the pattern image by, for example, the pattern matching (step 402).

The unit of the rotation angle obtained in this processing may be an angle obtained by dividing 90 degrees by at least two. The number for dividing the angle (a used angle obtained by dividing 90 degrees by the number) may vary between rotation angles obtained by the first angle determination part 41 and the second angle determination part 43.

At this time, the first angle determination part 41 adds one (1) to the first angle 0 counter 42a if the rotation angle of each pattern image in the block is the angle 0, adds 1 to the first angle 1 counter 42b if the rotation angle thereof is the angle 1, adds 1 to the first angle 2 counter 42c if the rotation angle thereof is the angle 2, or adds 1 to the first angle 3 counter 42d if the rotation angle thereof is the angle 3. Further, the second angle determination part 43 adds 1 to the second angle 0 counter 44a if the rotation angle of each pattern image in the block is the angle 0, 1 adds to the second angle 1 counter 44b if the rotation angle thereof is the angle 1, adds 1 to the second angle 2 counter 44c if the rotation angle thereof is the angle 2, or adds 1 to the second angle 3 counter 44d if the rotation angle thereof is the angle 3.

Then, the inhibition block determination part 45 analyzes, similarly to the first exemplary embodiment, the distribution state of the counted values of the first angle 0 counter 42a, the first angle 1 counter 42b, the first angle 2 counter 42c, and the first angle 3 counter 42d, respectively, in order to determine a rotation angle Ang 1 of the block (step 403). Further, the inhibition block determination part 45 also analyzes, similarly to the first exemplary embodiment, the distribution state of the counted values of the second angle 0 counter 44a, the second angle 1 counter 44b, the second angle 2 counter 44c, and the second angle 3 counter 44d, respectively, in order to determine a rotation angle Ang 2 of the block (step 404). It should be noted that, in this case, for descriptive purposes, the first angle determination part 41 performs the determination, followed by the second angle determination part 43. Alternatively, the second angle determination part 43 may perform the determination, followed by the first angle determination part 41, or the first angle determination part 41 and the second angle determination part 43 may perform the determination in parallel processing at the substantially same time. Likewise, regarding Ang 1 and Ang 2, the determination is carried out on Ang 1, followed by Ang 2. However, Ang 2 may be determined, followed by Ang 1, or Ang 1 and Ang 2 may be determined in parallel processing at the substantially same time.

Next, the inhibition block determination part 45 determines whether or not the Ang 1 and the Ang 2 determined by these two methods correspond to each other (step 405). It should be noted that the expression "correspondence" has been used for descriptive purposes. Accordingly, a certain range may be set for the angles which are determined to "correspond" to each other. In other words, even if angles do not completely correspond to each other, but the angles are within a certain range for approximation, the angles may be determined to "correspond" to each other. For example, in the case where one angle is adjacent to the other angle, these angles may be determined to "correspond" to each other.

If it is determined that the Ang 1 and the Ang 2 do not correspond to each other, the block is excluded from being subjected to the inhibition code detection (step 407).

On the other hand, if it is determined that the Ang 1 and the Ang 2 correspond to each other, it is determined whether or not the Ang 1 is the angle 4 (step 406). To be more specific, as shown in FIG. 8, it is determined whether the counted value of one rotation angle is much greater than the others in the histogram of the rotation angles or the counted values of two angles adjacent to each other are much greater than the others in the histogram of the rotation angles.

As a result, if it is determined that the Ang 1 is the angle 4, the block is excluded from being subjected to the inhibition code detection (step 407).

On the other hand, if it is determined that the Ang 1 is not the angle 4, the processing is terminated with no further action. This is because, in the third exemplary embodiment, it is configured that each of the blocks is subjected to the inhibition code detection unless information indicating that the target block is excluded from being subjected to the inhibition code detection is outputted to the inhibition code detection part 14.

Fourth Exemplary Embodiment

The fourth exemplary embodiment, as well as the second exemplary embodiment, focuses on the fact that a rotation angle obtained by a method based on relative positions of two or more code images is supposed to correspond to a rotation angle obtained by other method. However, unlike the second exemplary embodiment in which it is determined whether or not a block is to be subjected to the inhibition code detection, in the fourth exemplary embodiment, a pattern image which does not follow a certain rule is masked as being identified not to be a code image.

Figure 14:
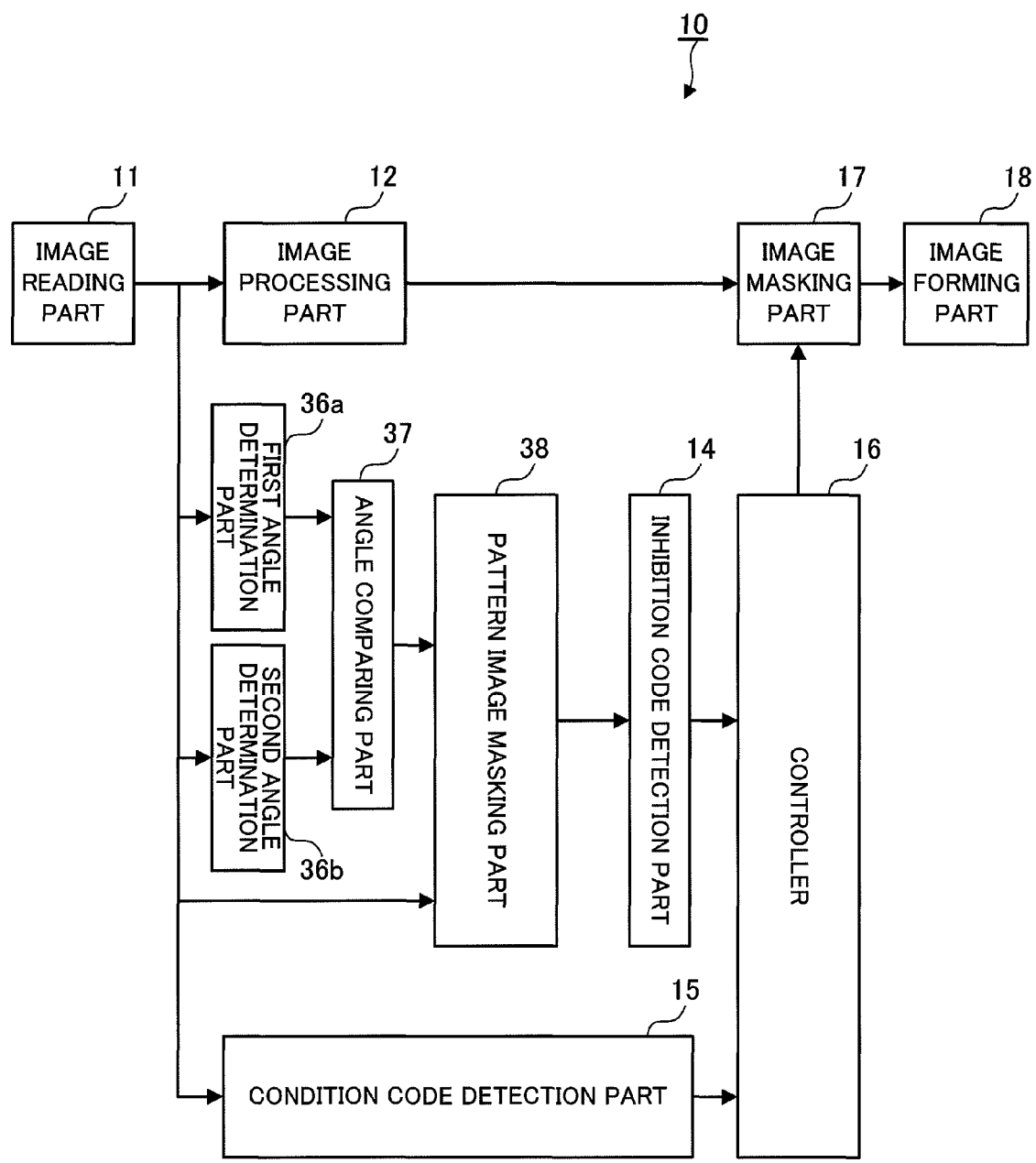
FIG. 14 is a block diagram illustrating a configuration example of the copying apparatus in the fourth exemplary embodiment.

FIG. 14 is a block diagram illustrating a configuration example of the copying apparatus 10 in the fourth exemplary embodiment.

As shown in the figure, the copying apparatus 10 is provided with the image reading part 11, the image processing part 12, the inhibition code detection part 14, the condition code detection part 15, the controller 16, the image masking part 17 and the image forming part 18. In addition, the copying apparatus 10 is provided with a first angle determination part 36a, a second angle determination part 36b, an angle comparing part 37 and a pattern image masking part 38.

Since a description has been given of the image reading part 11, the image processing part 12, the inhibition code detection part 14, the condition code detection part 15, the controller 16, the image masking part 17 and the image forming part 18 among them in the first exemplary embodiment, a detail description thereof is omitted here.

The first angle determination part 36a detects a pattern image from image data inputted from the image reading part 11, and determines a rotation angle of the pattern image by a first method. The first method in this case is a determination method based on relative positions of two or more code images. For example, as described in the first exemplary embodiment, a determination method using an angle determination window may be adopted. In the fourth exemplary embodiment, the first angle determination part 36a is provided as an example of a first angle determination unit that determines a rotation angle of a specified image by a first method.

The second angle determination part 36b detects a pattern image from the image data inputted from the image reading part 11, and determines a rotation angle of the pattern image by a second method. As the second method in this case, for example, a pattern matching method may be adopted. Since the pattern matching method for determining a rotation angle is a publicly-known technique, a detailed description is omitted. Alternatively, other method may be adopted as the second method. In particular, a determination method based on relative positions of code images that is similar to the one adopted in the first angle determination part 36a may be adopted, but the method is different from the one adopted in the first angle determination part 36a. In the fourth exemplary embodiment, the second angle determination part 36b is provided as an example of a second angle determination unit that determines a rotation angle of a specified image by the second method.

The angle comparing part 37 determines whether or not the rotation angle determined by the first angle determination part 36a corresponds to the rotation angle determined by the second angle determination part 36b, and outputs the result of the determination.

The pattern image masking part 38 determines a pattern image to be excluded from being subjected to the inhibition code determination on the basis of the result of rotation angle comparison by the angle comparing part 37, and then masks the pattern image. In the fourth exemplary embodiment, the pattern image masking part 38 is provided as an example of a determination unit that determines whether or not a specified image is to be subjected to detection, and as an example of a processing target determination unit that determines whether or not a specified image is to be subjected to a predetermined processing.

It should be noted that, although the fourth exemplary embodiment will be described on condition that a pattern image is excluded from being subjected to the inhibition code detection and then is masked, the present invention is not limited to this. To be more specific, a pattern image may be excluded from being subjected to condition code detection and then be masked. In such a case, it is recommended that the first angle determination part 36a, the second angle determination part 36b, the angle comparing part 37 and the pattern image masking part 38 may be provided in the preceding portion of the condition code detection part 15.

In the following section, the operation of the copying apparatus 10 will be described. The operation of the image reading part 11, the image processing part 12, the inhibition code detection part 14, the condition code detection part 15, the controller 16, the image masking part 17 and the image forming part 18 has been described in the first exemplary embodiment; thus, the following section will provide a description of a pattern image masking processing by the first angle determination part 36a, the second angle determination part 36b, the angle comparing part 37 and the pattern image masking part 38.

Figure 15:
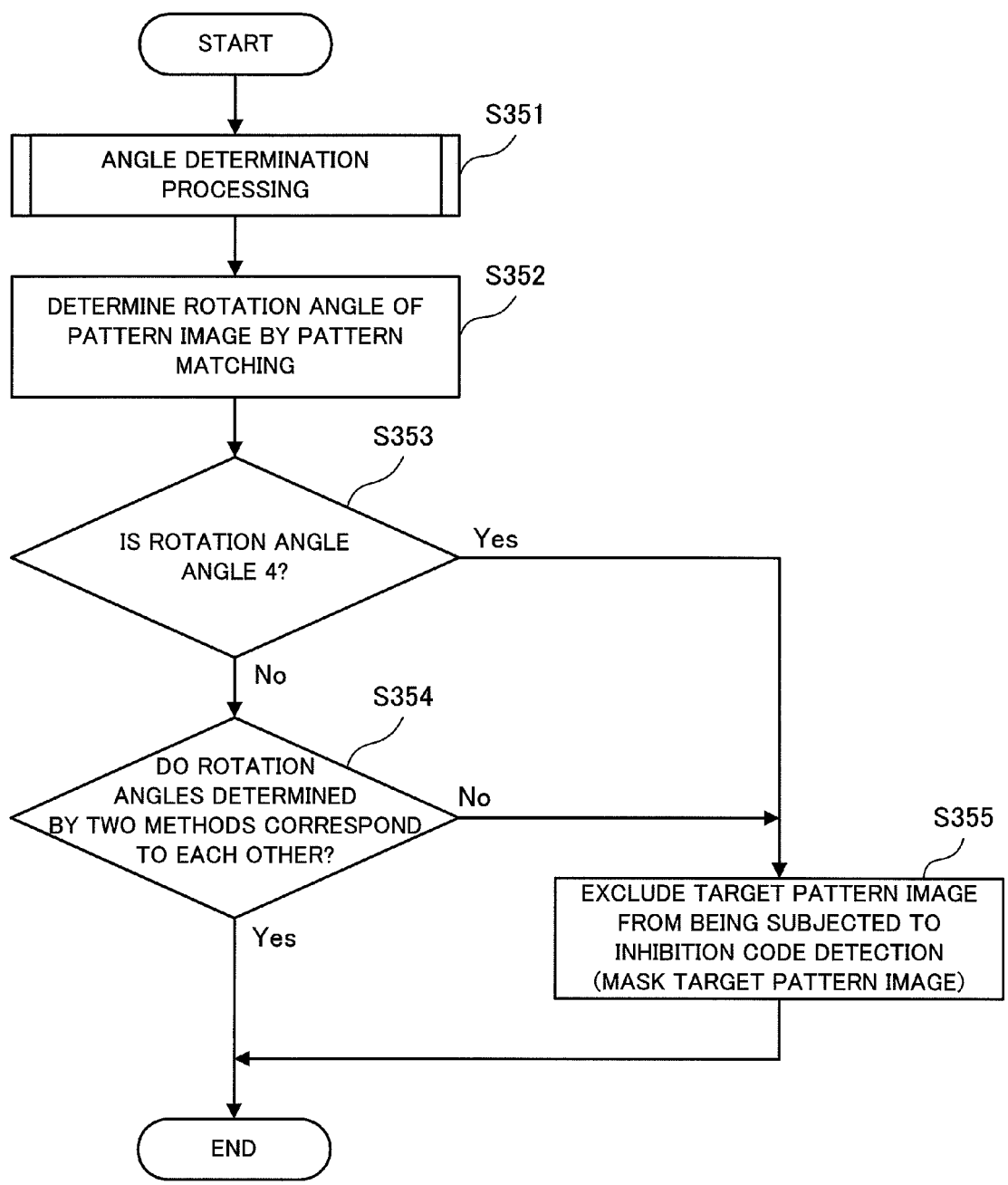
FIG. 15 is a flowchart illustrating an operation example during the pattern image masking processing.

FIG. 15 is a flowchart illustrating an operation example during the pattern image masking processing. Prior to this operation example, it is assumed that the first angle determination part 36a and the second angle determination part 36b detect a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the fourth exemplary embodiment, the first angle determination part 36a and the second angle determination part 36b are provided as an example of a detection unit that detects a specified image.

Once the operation is initiated, the first angle determination part 36a performs an angle determination processing for determining a rotation angle of a pattern image (step 351). Since the angle determination processing has been described in detail in the first exemplary embodiment, further description will not be provided. Next, the second angle determination part 36b determines the rotation angle of the pattern image by, for example, the pattern matching (step 352). It should be noted that, in this case, for descriptive purposes, the first angle determination part 36a performs the determination, followed by the second angle determination part 36b. Alternatively, the second angle determination part 36b may perform the determination, followed by the first angle determination part 36a, or the first angle determination part 36a and the second angle determination part 36b may perform the determination in parallel processing at the substantially same time.

The unit of the rotation angle obtained in this processing may be an angle obtained by dividing 90 degrees by at least two. The number for dividing the angle (a used angle obtained by dividing 90 degrees by the number) may vary between the rotation angles obtained by the first angle determination part 36a and the second angle determination part 36b.

Next, the angle comparing part 37 determines whether or not the rotation angle determined in step 351 is the angle 4 (step 353). In this case, the angle 4 is, as described above with reference to FIG. 7, an angle outputted as a determination result in the case where the number of flags set to ON among the angle 0 flag, the angle 1 flag, the angle 2 flag, and the angle 3 flag is not one (1).

As a result, if it is determined that the rotation angle determined in step 351 is the angle 4, the pattern image is excluded from being subjected to the inhibition code detection, and then is masked (step 355).

On the other hand, if it is determined that the rotation angle determined in step 351 is not the angle 4, it is determined whether or not the rotation angles determined by these two methods correspond to each other (step 354).

As a result, if it is determined that the rotation angles do not correspond to each other, the pattern image is excluded from being subjected to the inhibition code detection, and then is masked (step 355).

On the other hand, if it is determined that the rotation angles correspond to each other, the processing is terminated with no further action. This is because, in the fourth exemplary embodiment, it is configured that each of the pattern images is subjected to the inhibition code detection unless information indicating that the target pattern image is excluded from being subjected to the inhibition code detection is outputted to the inhibition code detection part 14.

It should be noted that the expression "correspondence" has been used for descriptive purposes. Accordingly, a certain range may be set for the angles which are determined to "correspond" to each other. In other words, even if angles do not completely correspond to each other, but the angles are within a certain range for approximation, the angles may be determined to "correspond" to each other. For example, in the case where one angle is adjacent to the other angle, these angles may be determined to "correspond" to each other.

Fifth Exemplary Embodiment

The fifth exemplary embodiment focuses on the fact that a distance between two code images is supposed to be equal to a predetermined distance.

Figure 16:
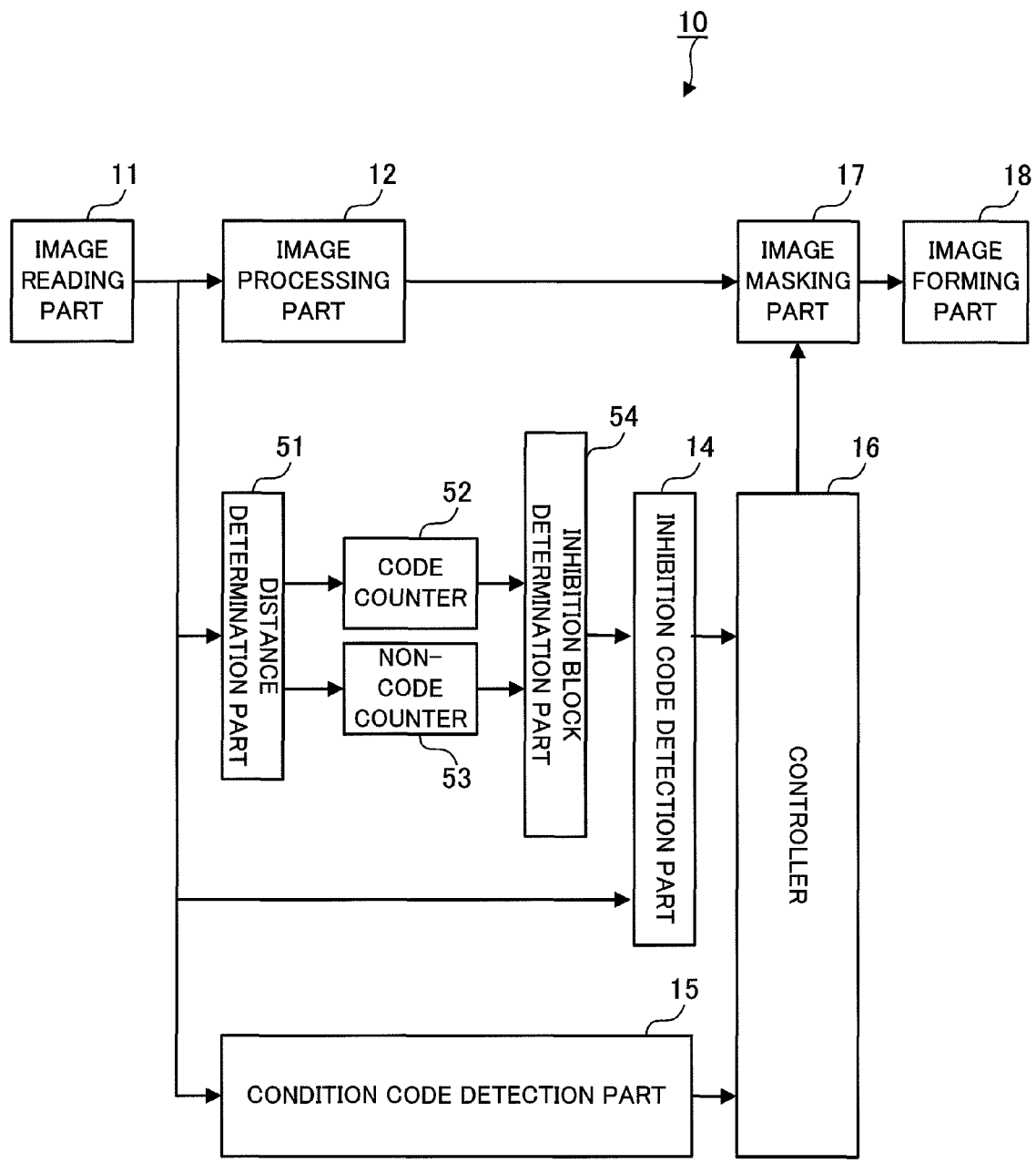
FIG. 16 is a block diagram illustrating a configuration example of the copying apparatus 10 in the fifth exemplary embodiment.

FIG. 16 is a block diagram illustrating a configuration example of the copying apparatus 10 in the fifth exemplary embodiment.

As shown in the figure, the copying apparatus 10 is provided with the image reading part 11, the image processing part 12, the inhibition code detection part 14, the condition code detection part 15, the controller 16, the image masking part 17 and the image forming part 18. In addition, the copying apparatus 10 is provided with a distance determination part 51, a code counter 52, a non-code counter 53 and an inhibition block determination part 54.

Since a description has been given of the image reading part 11, the image processing part 12, the inhibition code detection part 14, the condition code detection part 15, the controller 16, the image masking part 17 and the image forming part 18 among them in the first exemplary embodiment, a detail description thereof is omitted here.

The distance determination part 51 detects a pattern image from image data inputted from the image reading part 11, determines whether or not the pattern image is a code image, and outputs the determination result. In this case, it is determined whether or not a target pattern image is a code image based on whether or not other pattern image is present at a position away from the target pattern image by a distance between the code images. In the fifth exemplary embodiment, the distance determination part 51 is provided as an example of a first determination unit that determines whether or not a specified image is present.

The code counter 52 is a counter that counts the number of times information indicating that a target pattern image is a code image is outputted from the distance determination part 51.

The non-code counter 53 is a counter that counts the number of times information indicating that a target pattern image is not a code image is outputted from the distance determination part 51.

The inhibition block determination part 54 determines whether or not a block is to be subjected to the inhibition code detection on the basis of respective counted values in the code counter 52 and the non-code counter 53. In the fifth exemplary embodiment, the inhibition block determination part 54 is provided as an example of a determination unit that determines whether or not a specified region is to be subjected to detection, and also as an example of a second determination unit that determines whether or not a specified region is to be subjected to a predetermined processing.

It should be noted that, although the fifth exemplary embodiment will be described on condition that it is determined whether or not a block is to be subjected to the inhibition code detection, the present invention is not limited to this. In other words, it may be determined whether or not a block is to be subjected to condition code detection. In such a case, it is recommended that the distance determination part 51, the code counter 52, the non-code counter 53 and the inhibition block determination part 54 may be provided in a preceding portion of the condition code detection part 15.

In the following section, the operation of the copying apparatus 10 will be described. The operation of the image reading part 11, the image processing part 12, the inhibition code detection part 14, the condition code detection part 15, the controller 16, the image masking part 17 and the image forming part 18 has been described in the first exemplary embodiment; thus, the following section will provide a description of the inhibition block determination processing by the distance determination part 51 and the inhibition block determination part 54.

Figure 17:
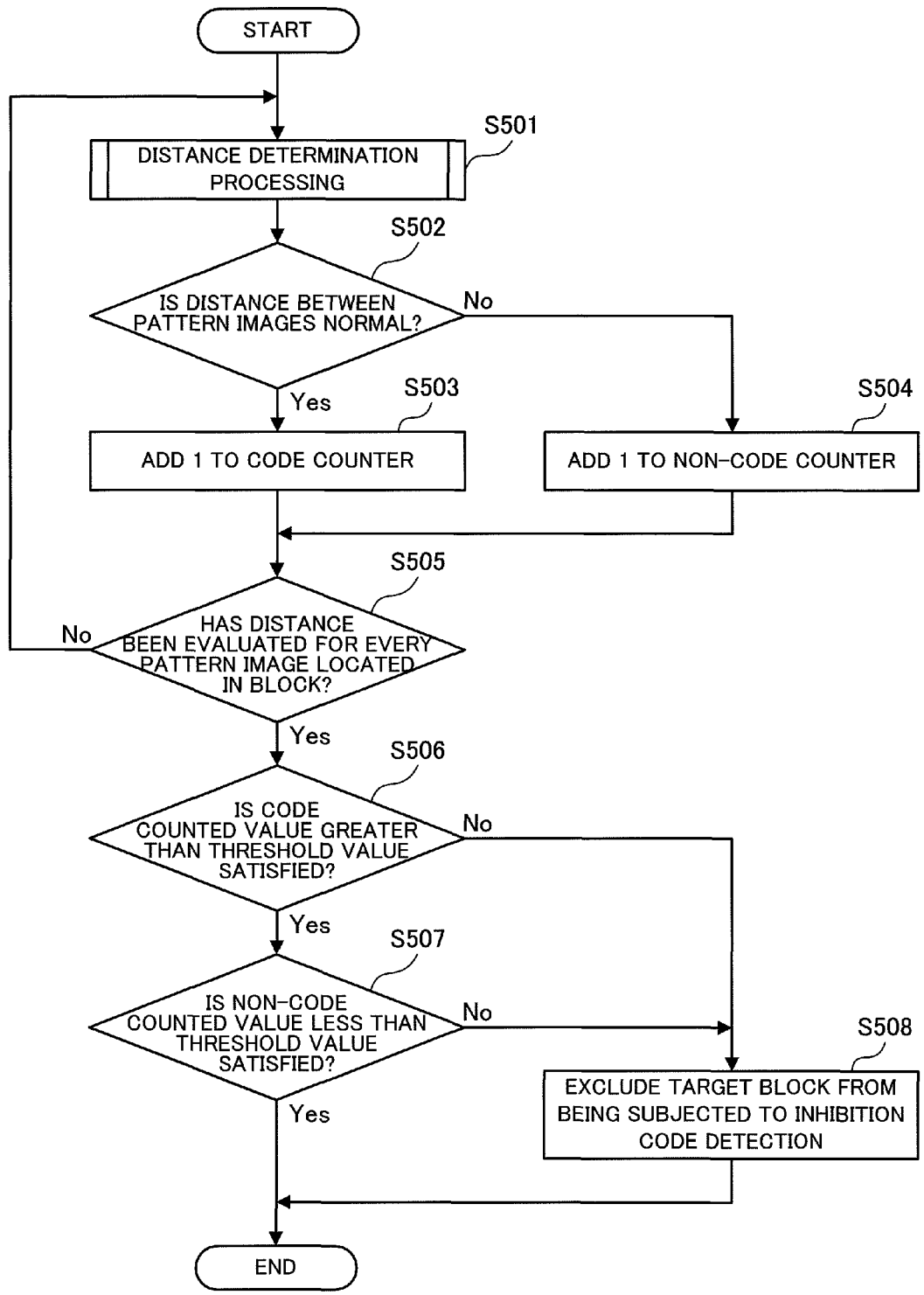
FIG. 17 is a flowchart illustrating a furthermore operation example during the inhibition block determination processing.

FIG. 17 is a flowchart illustrating a furthermore operation example during the inhibition block determination processing. Prior to this operation example, it is assumed that the distance determination part 51 detects a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the fifth exemplary embodiment, the distance determination part 51 is provided as an example of a detection unit that detects a specified image.

Once the operation is initiated, firstly, the distance determination part 51 performs a distance determination processing for determining whether or not a distance between pattern images is normal (step 501). This distance determination processing will be described in detail later.

Then, the distance determination part 51 determines whether or not the distance between the pattern images is normal (step 502). If the distance is normal, one (1) is added to the code counter 52 (step 503). If the distance is not normal, 1 is added to the non-code counter 53 (step 504). In this case, a "normal distance between pattern images" refers to a distance between pattern images being equal to a predetermined distance between code images.

Thereafter, the distance determination part 51 determines whether or not a distance has been evaluated for every pattern image located in the block (step 505). If it is determined that a distance has not been evaluated for every pattern image, the operation goes back to step 501, and then the same processing is repeated for the next pattern image. On the other hand, if it is determined that a distance has been evaluated for every pattern image, the operation proceeds to the inhibition block determination processing.

In the inhibition block determination processing, the inhibition block determination part 54 firstly determines whether or not a counted value of the code counter 52, which is expressed as a code counted value, greater than a threshold value TH_high is satisfied (step 506).

As a result, if it is determined that the code counted value greater than the threshold value TH_high is not satisfied, the block is excluded from being subjected to the inhibition code detection (step 508).

On the other hand, if it is determined that the code counted value greater than the threshold value TH_high is satisfied, it is then determined whether or not a counted value of the non-code counter 53, which is expressed as a non-code counted value, less than a threshold value TH_low is satisfied (step 507).

As a result, if it is determined that the non-code counted value less than the threshold value TH_low is not satisfied, the block is excluded from being subjected to the inhibition code detection (step 508).

On the other hand, if it is determined that the non-code counted value less than the threshold value TH_low is satisfied, the processing is terminated with no further action. This is because, in the fifth exemplary embodiment, it is configured that each of the blocks is subjected to the inhibition code detection unless information indicating that the target block is excluded from being subjected to the inhibition code detection is outputted to the inhibition code detection part 14.

In the following section, a detailed description will be given of a distance determination processing performed in step 501 in FIG. 17.

Figure 18C:
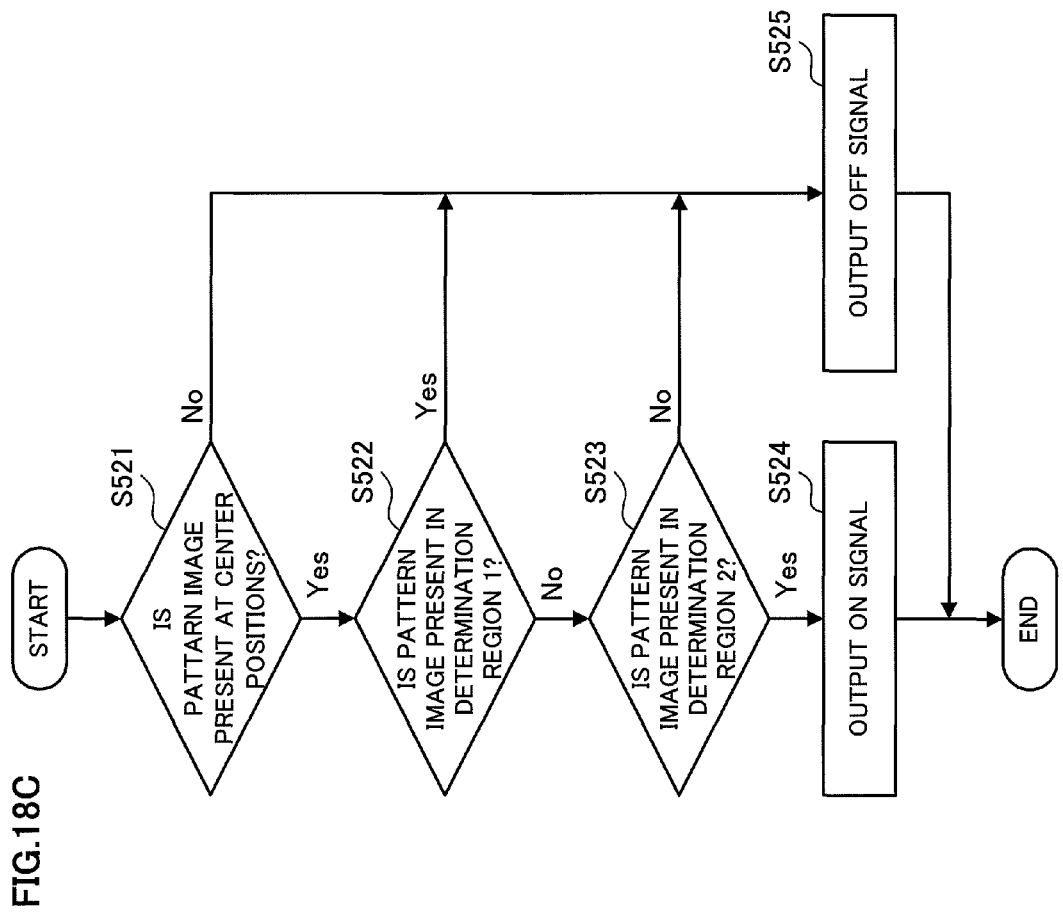
FIG. 18C is a flowchart illustrating an operation example of the distance determination part.
Figure 18A:
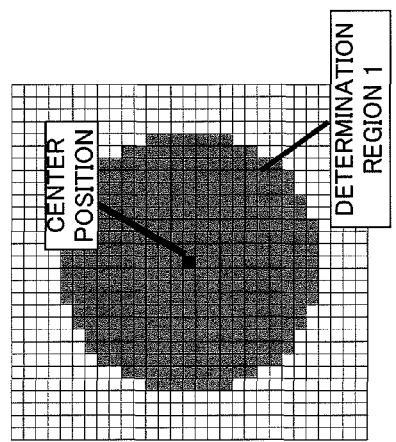
FIGS. 18A and 18B are a first distance determination window and a second distance determination window, respectively, used in this distance determination processing.
Figure 18B:
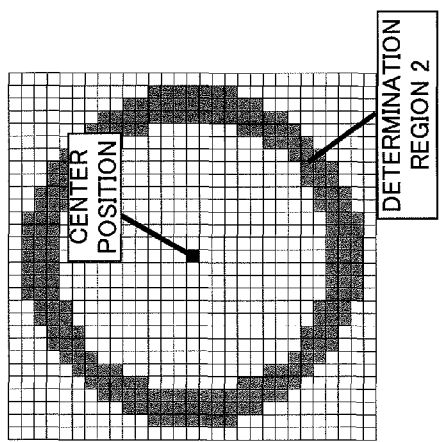

FIGS. 18A and 18B are a first distance determination window and a second distance determination window, respectively, used in this distance determination processing. FIG. 18C is a flowchart illustrating an operation example of the distance determination part 51.

First of all, the first distance determination window shown in FIG. 18A will be described.

This first distance determination window has a center position at a position which is to be superimposed onto a target pattern image, and has, around the center position, a determination region 1 which is a region inside of a circle having a radius smaller than the distance between code images.

Second, the second distance determination window shown in FIG. 18B will be described.

This second distance determination window has a center position at a position which is to be superimposed onto a target pattern image, and has, around the center position, a determination region 2 which is a region of a circumference of a circle having a radius same as the distance between code images.

In the next section, an operation example shown in FIG. 18C will be described.

Once the operation is initiated, the distance determination part 51 first superimposes the first distance determination window and the second distance determination window onto a certain position of the pattern center data, and then determines whether or not a pattern image is present at the center positions of these windows (step 521). If a pattern image is present at the center position, it is determined whether or not a pattern image is present in the determination region 1 in the first distance determination window (step 522). If no pattern image is present in the determination region 1, it is determined whether or not a pattern image is present in the determination region 2 in the second distance determination window (step 523). As a result, if a pattern image is present in the determination region 2, an ON signal is outputted for adding one (1) to the code counter 52 (step 524).

On the other hand, in the cases where it is determined that no pattern image is present at the center position in step 521, where it is determined that a pattern image is present in the determination region 1 in step 522, and where it is determined that no pattern image is present in the determination region 2 in step 523, an OFF signal is outputted for adding 1 to the non-code counter 53 (step 525).

It should be noted that, although it is determined that no pattern image is present in the determination region 1 in step 522, and that a pattern image is present in the determination region 2 in step 523, the present invention is not limited to this. For example, either one of the determinations in step 522 and step 523 may be performed.

Sixth Exemplary Embodiment

The sixth exemplary embodiment focuses on the fact that a distance between two code images is supposed to be equal to a predetermined distance, similarly to the fifth exemplary embodiment. However, unlike the fifth exemplary embodiment in which it is determined whether or not a block is to be subjected to the inhibition code detection, in the sixth exemplary embodiment, a pattern image which does not follow a certain rule is masked as being identified not to be a code image.

Figure 19:
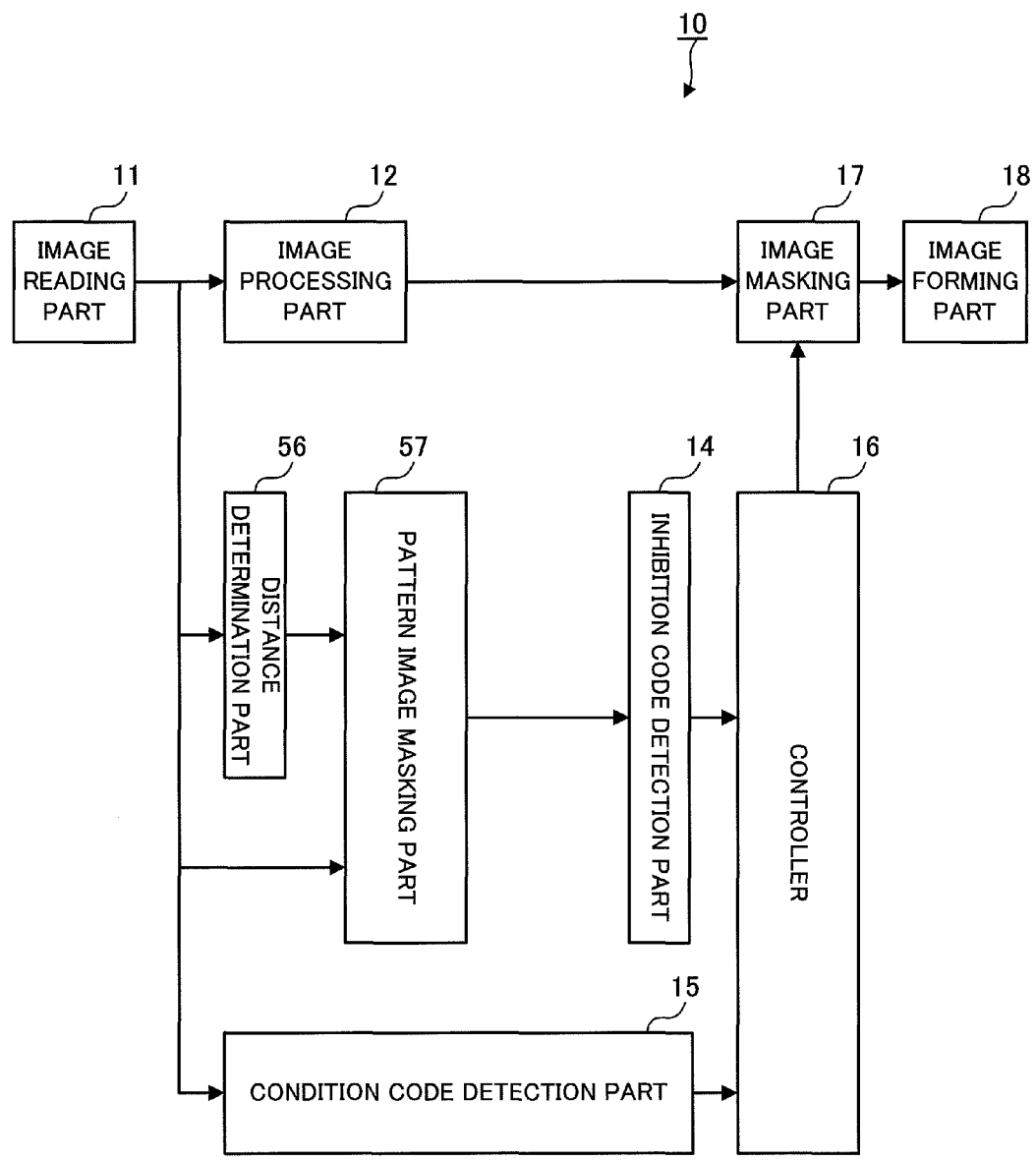
FIG. 19 is a block diagram illustrating a configuration example of the copying apparatus in the sixth exemplary embodiment.

FIG. 19 is a block diagram illustrating a configuration example of the copying apparatus 10 in the sixth exemplary embodiment.

As shown in the figure, the copying apparatus 10 is provided with the image reading part 11, the image processing part 12, the inhibition code detection part 14, the condition code detection part 15, the controller 16, the image masking part 17 and the image forming part 18. In addition, the copying apparatus 10 is provided with a distance determination part 56 and a pattern image masking part 57.

Since a description has been given of the image reading part 11, the image processing part 12, the inhibition code detection part 14, the condition code detection part 15, the controller 16, the image masking part 17 and the image forming part 18 among them in the first exemplary embodiment, a detail description thereof is omitted here.

The distance determination part 56 detects a pattern image from image data inputted from the image reading part 11, determines whether or not the pattern image is a code image, and outputs the determination result. In this case, it is determined whether or not a target pattern image is a code image based on whether or not other pattern image is present at a position away from the target pattern image by a distance between the code images. In the sixth exemplary embodiment, the distance determination part 56 is provided as an example of a first determination unit that determines whether or not a specified image is present.

The pattern image masking part 57 determines a pattern image to be excluded from being subjected to the inhibition code determination on the basis of information indicating whether or not the pattern image is a code image, which is outputted from the distance determination part 56, and then masks the pattern image. In the sixth exemplary embodiment, the pattern image masking part 57 is provided as an example of a determination unit that determines whether or not a specified image is to be subjected to detection, and as an example of a second determination unit that determines whether or not a specified image is to be subjected to a predetermined processing.

It should be noted that, although the sixth exemplary embodiment will be described on condition that a pattern image is excluded from being subjected to the inhibition code detection and then is masked, the present invention is not limited to this. To be more specific, a pattern image may be excluded from being subjected to condition code detection and then be masked. In such a case, it is recommended that the distance determination part 56 and the pattern image masking part 57 may be provided in the preceding portion of the condition code detection part 15.

In the following section, the operation of the copying apparatus 10 will be described. The operation of the image reading part 11, the image processing part 12, the inhibition code detection part 14, the condition code detection part 15, the controller 16, the image masking part 17 and the image forming part 18 has been described in the first exemplary embodiment; thus, the following section will provide a description of a pattern image masking processing by the distance determination part 56 and the pattern image masking part 57.

Figure 20:
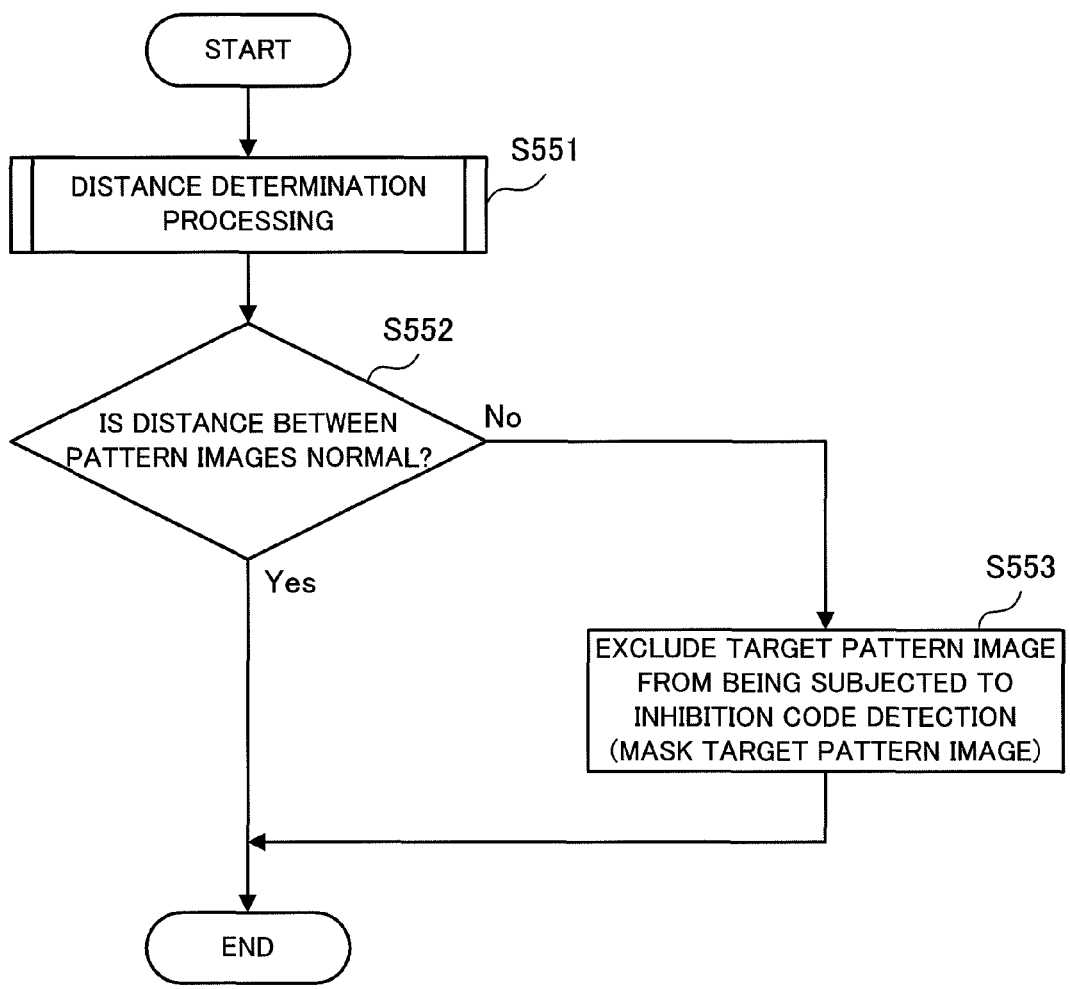
FIG. 20 is a flowchart illustrating an operation example during the pattern image masking processing

FIG. 20 is a flowchart illustrating an operation example during the pattern image masking processing. Prior to this operation example, it is assumed that the distance determination part 56 detects a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the sixth exemplary embodiment, the distance determination part 56 is provided as an example of a detection unit that detects a specified image.

Once the operation is initiated, firstly, the distance determination part 56 performs a distance determination processing for determining whether or not a distance between pattern images is normal (step 551). Since this distance determination processing has been described in detail in the fifth exemplary embodiment, the description thereof is omitted.

Then, the distance determination part 56 determines whether or not the distance between the pattern images is normal (step 552).

As a result, if it is determined that the distance between the pattern images is not normal, the pattern image is excluded from being subjected to the inhibition code detection, and then is masked (step 553).

On the other hand, if it is determined that the distance between the pattern images is normal, the processing is terminated with no further action. This is because, in the sixth exemplary embodiment, it is configured that each of the pattern images is subjected to the inhibition code detection unless information indicating that the target pattern image is excluded from being subjected to the inhibition code detection is outputted to the inhibition code detection part 14.

Seventh Exemplary Embodiment

The seventh exemplary embodiment focuses on the fact that two or more code images are supposed to be in a predetermined arrangement.

Figure 21:
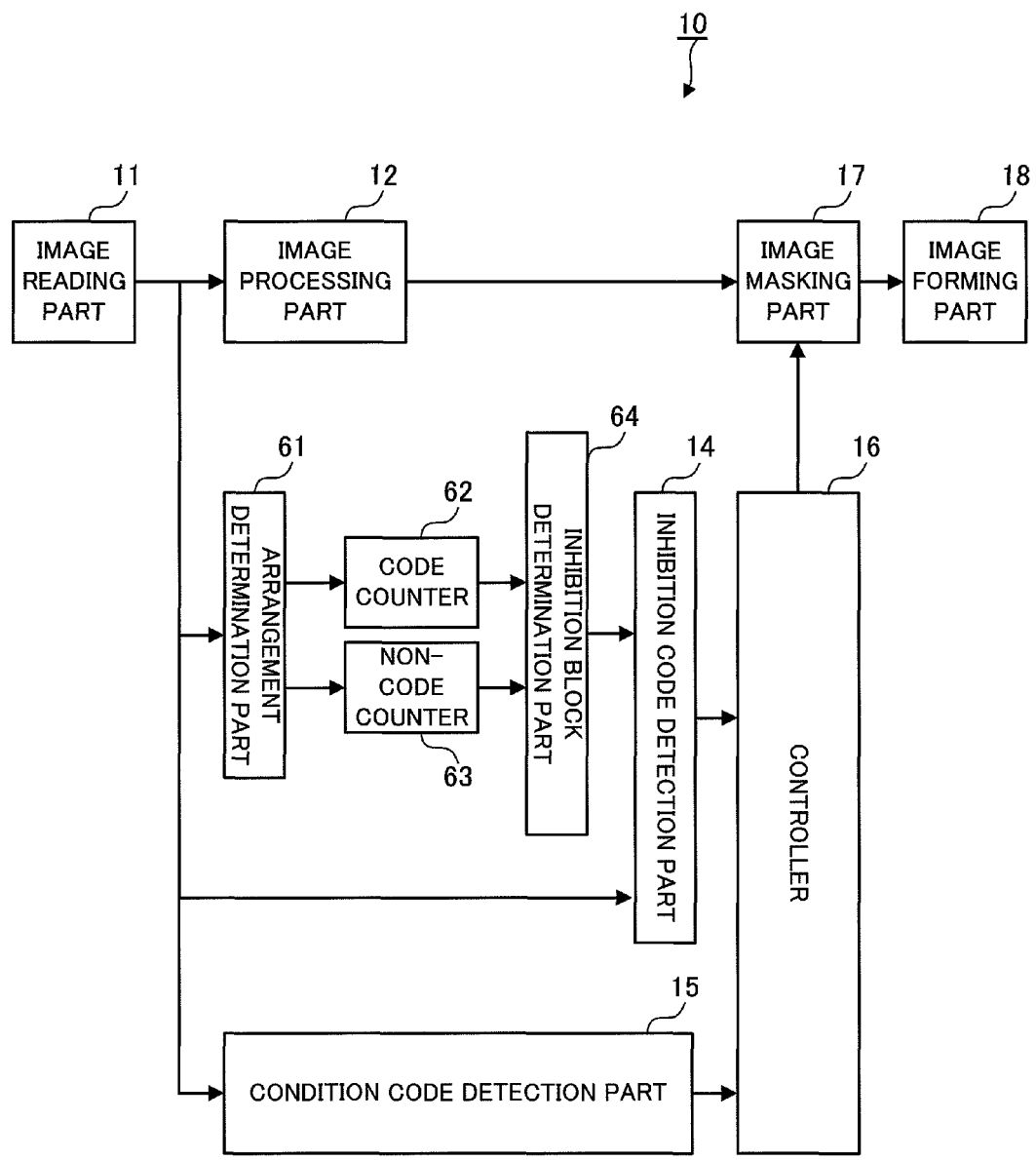
FIG. 21 is a block diagram illustrating a configuration example of the copying apparatus in the seventh exemplary embodiment.

FIG. 21 is a block diagram illustrating a configuration example of the copying apparatus 10 in the seventh exemplary embodiment.

As shown in the figure, the copying apparatus 10 is provided with the image reading part 11, the image processing part 12, the inhibition code detection part 14, the condition code detection part 15, the controller 16, the image masking part 17 and the image forming part 18. In addition, the copying apparatus 10 is provided with an arrangement determination part 61, a code counter 62, a non-code counter 63, and an inhibition block determination part 64.

Since a description has been given of the image reading part 11, the image processing part 12, the inhibition code detection part 14, the condition code detection part 15, the controller 16, the image masking part 17 and the image forming part 18 among them in the first exemplary embodiment, a detail description thereof is omitted here.

The arrangement determination part 61 detects a pattern image from image data inputted from the image reading part 11, determines whether or not the pattern image is a code image, and then outputs the determination result. In this case, it is determined whether or not the pattern image is a code image based on whether or not other pattern image is present at a position where a code image is expected to be present in the case where the target pattern image is assumed to be a code image. In the seventh exemplary embodiment, the arrangement determination part 61 is provided as an example of a first determination unit that determines whether or not a specified image is present.

The code counter 62 is a counter that counts the number of times information indicating that the target pattern image is a code image is outputted from the arrangement determination part 61.

The non-code counter 63 is a counter that counts the number of times information indicating that the target pattern image is not a code image is outputted from the arrangement determination part 61.

The inhibition block determination part 64 determines whether or not a block is to be subjected to the inhibition code detection on the basis of the counted values of the code counter 62 and the non-code counter 63, respectively. In the seventh exemplary embodiment, the inhibition block determination part 64 is provided as an example of a determination unit that determines whether or not a specified region is to be subjected to detection, and also as an example of a second determination unit that determines whether or not a specified region is to be subjected to a predetermined processing.

It should be noted that, although the seventh exemplary embodiment will be described on condition that it is determined whether or not a block is to be subjected to the inhibition code detection, the present invention is not limited to this. In other words, it may be determined whether or not a block is to be subjected to condition code detection. In such a case, it is recommended that the arrangement determination part 61, the code counter 62, the non-code counter 63 and the inhibition block determination part 64 may be provided in a preceding portion of the condition code detection part 15.

In the following section, the operation of the copying apparatus 10 will be described. The operation of the image reading part 11, the image processing part 12, the inhibition code detection part 14, the condition code detection part 15, the controller 16, the image masking part 17 and the image forming part 18 has been described in the first exemplary embodiment; thus, the following section will provide a description of the inhibition block determination processing by the arrangement determination part 61 and the inhibition block determination part 64.

FIG. 22 is a flowchart illustrating a furthermore operation example during the inhibition block determination processing. Prior to this operation example, it is assumed that the arrangement determination part 61 detects a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the seventh exemplary embodiment, the arrangement determination part 61 is provided as an example of a detection unit that detects a specified image.

Once the operation is initiated, the arrangement determination part 61 firstly performs an arrangement determination processing for determining whether or not an arrangement of a pattern image is normal (step 601). This arrangement determination processing will be described in detail later.

Then, the arrangement determination part 61 determines whether or not an arrangement of the pattern image is normal (step 602). If the arrangement is normal, one (1) is added to the code counter 62 (step 603). If the arrangement is not normal, 1 is added to the non-code counter 63 (step 604). In this case, a "normal arrangement of a pattern image" indicates that an arrangement of a pattern image follows a predetermined rule for an arrangement of a code image.

Thereafter, the arrangement determination part 61 determines whether or not arrangements have been evaluated for every pattern image within the block (step 605). If it is determined that the arrangements have not been evaluated for every pattern image, the operation goes back to step 601, and the same processing is repeated for the next pattern image. On the other hand, if it is determined that the arrangements have been evaluated for every pattern image, the operation proceeds to the inhibition block determination processing.

In the inhibition block determination processing, the inhibition block determination part 64 firstly determines whether or not a counted value of the code counter 62, which is expressed as a code counted value, greater than a threshold value TH_high is satisfied (step 606).

As a result, if it is determined that the code counted value greater than the threshold value TH_high is not satisfied, the block is excluded from being subjected to the inhibition code detection (step 608).

On the other hand, if it is determined that the code counted value greater than the threshold value TH_high is satisfied, it is then determined whether or not a counted value of the non-code counter 63, which is expressed as a non-code counted value, less than a threshold value TH_low is satisfied (step 607).

As a result, if it is determined that the non-code counted value less than the threshold value TH_low is not satisfied, the block is excluded from being subjected to the inhibition code detection (step 608).

On the other hand, if it is determined that the non-code counted value less than the threshold value TH_low is satisfied, the processing is terminated with no further action. This is because, in the seventh exemplary embodiment, it is configured that each of the blocks is subjected to the inhibition code detection unless information indicating that the target block is excluded from being subjected to the inhibition code detection is outputted to the inhibition code detection part 14.

In the following section, a detailed description will be given of the arrangement determination processing performed in step 601 in FIG. 22.

Figure 23A:
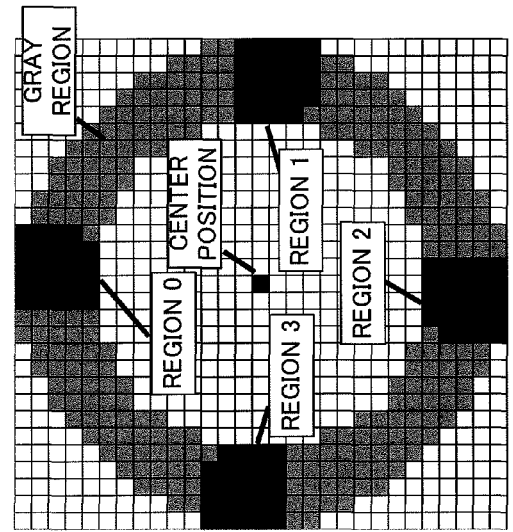
FIG. 23A is an arrangement 1 determination window used in this arrangement determination processing.
Figure 23B:
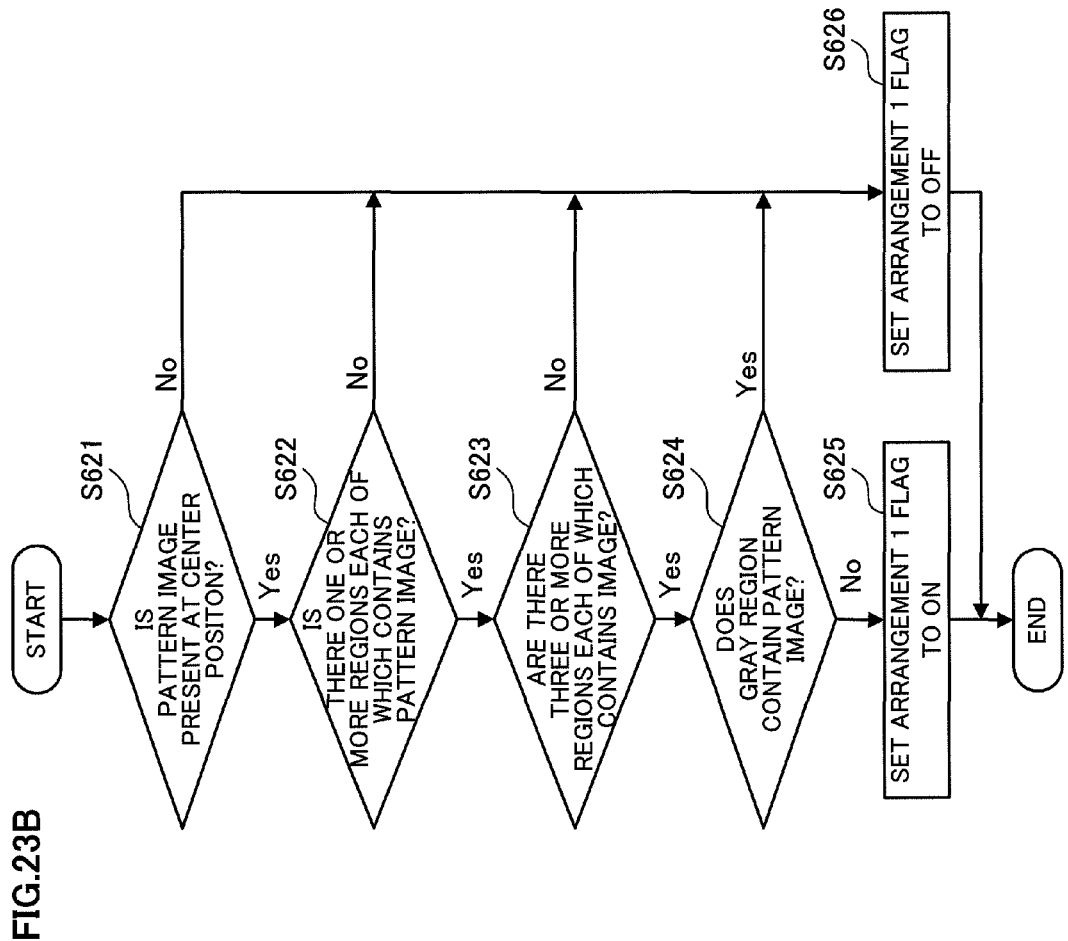
FIG. 23B is a flowchart illustrating an operation example of the arrangement determination part.

FIG. 23A is an arrangement 1 determination window used in this arrangement determination processing, and FIG. 23B is a flowchart illustrating an operation example of the arrangement determination part 61.

First of all, the arrangement 1 determination window in FIG. 23A will be described.

In this arrangement 1 determination window, positions where code images adjacent to the code image are supposed to be present are shown as a region 0, a region 1, a region 2 and a region 3, respectively, and a position where no code image adjacent to the code image is supposed to be present is shown as a gray region, in the case where a skew angle of an image read out by the image reading part 11 is 0 degree, and where the center of the code image is located at the center position of the window.

In the following section, the operation example in FIG. 23B will be described.

Once the operation is initiated, the arrangement determination part 61 firstly determines whether or not a pattern image is present at the center position of the arrangement 1 determination window by superimposing the arrangement 1 determination window on a certain position of the pattern center data (step 621). If a pattern image is present at the center position, it is determined whether or not there is one or more regions each of which contains the pattern image, among the regions 0 to 3 (step 622). If there are one or more regions each containing the pattern image, it is determined whether or not there are three or more regions each of which contains an image, among the regions 0 to 3 (step 623). In this case, the image refers not only to a code image but also to a regular image, such as letters and lines. In other words, the arrangement determination part 61 performs this determination operation by superimposing the arrangement 1 determination window on the same position in the image data inputted from the image reading part 11. If the result suggests that there are three or more regions each containing the image, it is then determined that the gray region contains no pattern image (step 624). As a result, if it is determined that the gray region contains no pattern image, an arrangement 1 flag is set to ON (step 625).

On the other hand, in the cases where it is determined that no pattern image is located at the center position in step 621, where it is determined that there is not one or more regions each containing the pattern image in step 622, where it is determined that there are not three or more regions each containing the image in step 623, and where it is determined that the gray region contains a pattern image in step 624, the arrangement 1 flag is set to OFF (step 626).

It should be noted that, since only two of the regions 0 to 3 may each contain the code image on an edge of a medium, it may be determined whether or not there are two or more regions each containing the image in step 623. Alternatively, in case of providing a tighter condition, it may be determined whether or not there are four or more regions each containing an image.

The arrangement determination processing described above is for the arrangement 1 (a corresponding arrangement for the angle 0), and the same processing is also performed for arrangements 2 to 4. To be more specific, for the arrangement 2 (a corresponding arrangement for the angle 1), an arrangement 2 flag is set to either ON or OFF by using an arrangement 2 determination window (refer to FIG. 24 that is a diagram for explaining an operation example of an arrangement determination part 61 according to the seventh exemplary embodiment). Further, for the arrangement 3 (a corresponding arrangement for the angle 2), an arrangement 3 flag is set to either ON or OFF by using an arrangement 3 determination window (refer to FIG. 24). Furthermore, for the arrangement 4 (a corresponding arrangement for the angle 3), an arrangement 4 flag is set to either ON or OFF by using an arrangement 4 determination window (refer to FIG. 24).

In the following section, a description will be given of a method for determining whether or not an arrangement is normal according to flags each having been set to either ON or OFF for individual arrangements.

Figure 24:
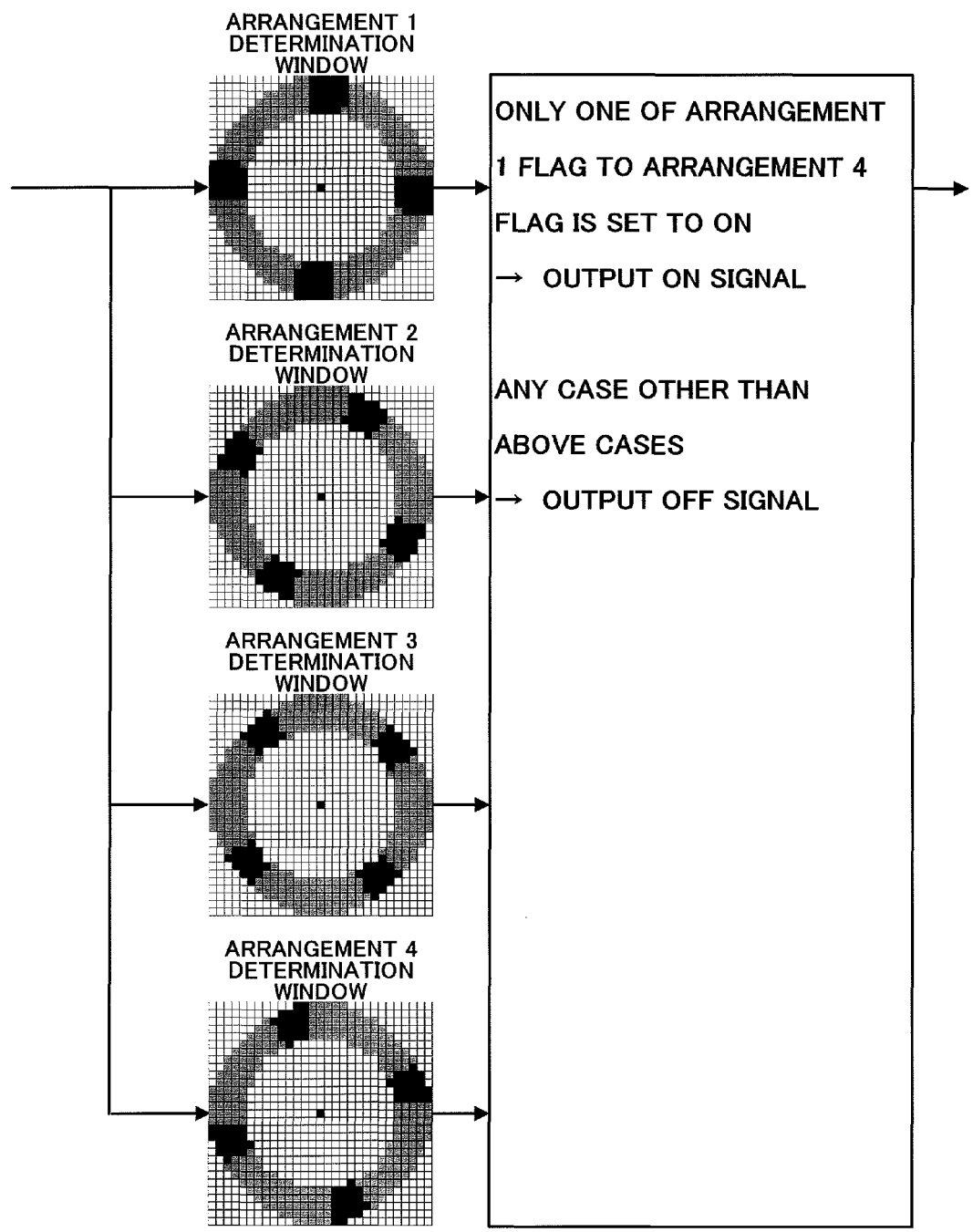
FIG. 24 is a diagram for explaining an operation example of an arrangement determination part according to the seventh exemplary embodiment.

FIG. 24 is a diagram schematically illustrating the determination method.

As shown in the figure, an ON signal indicating that an arrangement is normal is outputted in the case where only one of the arrangement 1 flag, the arrangement 2 flag, the arrangement 3 flag and the arrangement 4 flag is set to ON. In any case other than such a case, an OFF signal indicating an arrangement is not normal is outputted.

In FIG. 24, it is shown that the regions 0 to 3 are not overlapped with each other in the arrangement 1 determination window, the arrangement 2 determination window, the arrangement 3 determination window and the arrangement 4 determination window. However, the regions 0 to 3 in one determination window may be partially overlapped with the regions 0 to 3 in different determination window. For example, some parts of the regions 0 to 3 in the arrangement 1 determination window and those in the arrangement 2 determination window may occupy same areas. In addition, although there are 4 kinds of angles in the seventh exemplary embodiment, two kinds of angles may be accepted as the minimum number. On the contrary, more than 4 kinds of angles may be accepted.

Eighth Exemplary Embodiment

The eighth exemplary embodiment focuses on the fact that two or more code images are supposed to be in a predetermined arrangement, similarly to the seventh exemplary embodiment. However, unlike the seventh exemplary embodiment in which it is determined whether or not a block is to be subjected to the inhibition code detection, in the eighth exemplary embodiment, a pattern image which does not follow a certain rule is masked as being identified not to be a code image.

Figure 25:
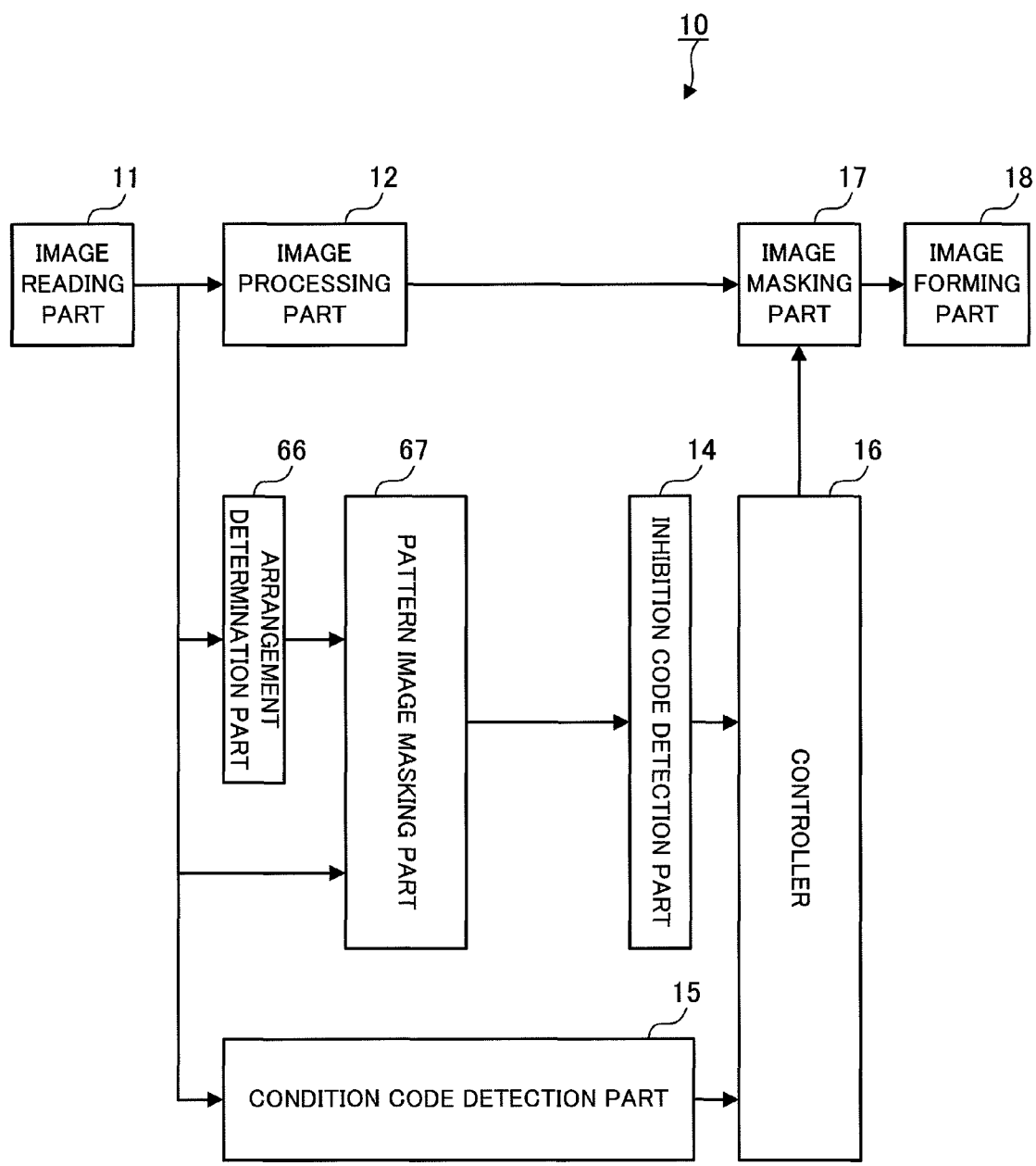
FIG. 25 is a block diagram illustrating a configuration example of the copying apparatus in the eighth exemplary embodiment.

FIG. 25 is a block diagram illustrating a configuration example of the copying apparatus 10 in the eighth exemplary embodiment.

As shown in the figure, the copying apparatus 10 is provided with the image reading part 11, the image processing part 12, the inhibition code detection part 14, the condition code detection part 15, the controller 16, the image masking part 17 and the image forming part 18. In addition, the copying apparatus 10 is provided with an arrangement determination part 66 and a pattern image masking part 67.

Since a description has been given of the image reading part 11, the image processing part 12, the inhibition code detection part 14, the condition code detection part 15, the controller 16, the image masking part 17 and the image forming part 18 among them in the first exemplary embodiment, a detail description thereof is omitted here.

The arrangement determination part 66 detects a pattern image from image data inputted from the image reading part 11, determines whether or not the pattern image is a code image, and then outputs the determination result. In this case, it is determined whether or not the pattern image is a code image based on whether or not other pattern image is present at a position where a code image is expected to be present in the case where the target pattern image is assumed to be a code image. In the eighth exemplary embodiment, the arrangement determination part 66 is provided as an example of a first determination unit that determines whether or not a specified image is present.

The pattern image masking part 67 determines a pattern image to be excluded from being subjected to the inhibition code determination on the basis of information indicating whether or not the pattern image is a code image, which is outputted from the arrangement determination part 66, and then masks the pattern image. In the eighth exemplary embodiment, the pattern image masking part 67 is provided as an example of a determination unit that determines whether or not a specified image is to be subjected to detection, and as an example of a second determination unit that determines whether or not a specified image is to be subjected to a predetermined processing.

It should be noted that, although the eighth exemplary embodiment will be described on condition that a pattern image is excluded from being subjected to the inhibition code detection and then is masked, the present invention is not limited to this. To be more specific, a pattern image may be excluded from being subjected to condition code detection and then be masked. In such a case, it is recommended that the arrangement determination part 66 and the pattern image masking part 67 may be provided in the preceding portion of the condition code detection part 15.

In the following section, the operation of the copying apparatus 10 will be described. The operation of the image reading part 11, the image processing part 12, the inhibition code detection part 14, the condition code detection part 15, the controller 16, the image masking part 17 and the image forming part 18 has been described in the first exemplary embodiment; thus, the following section will provide a description of a pattern image masking processing by the arrangement determination part 66 and the pattern image masking part 67.

Figure 26:
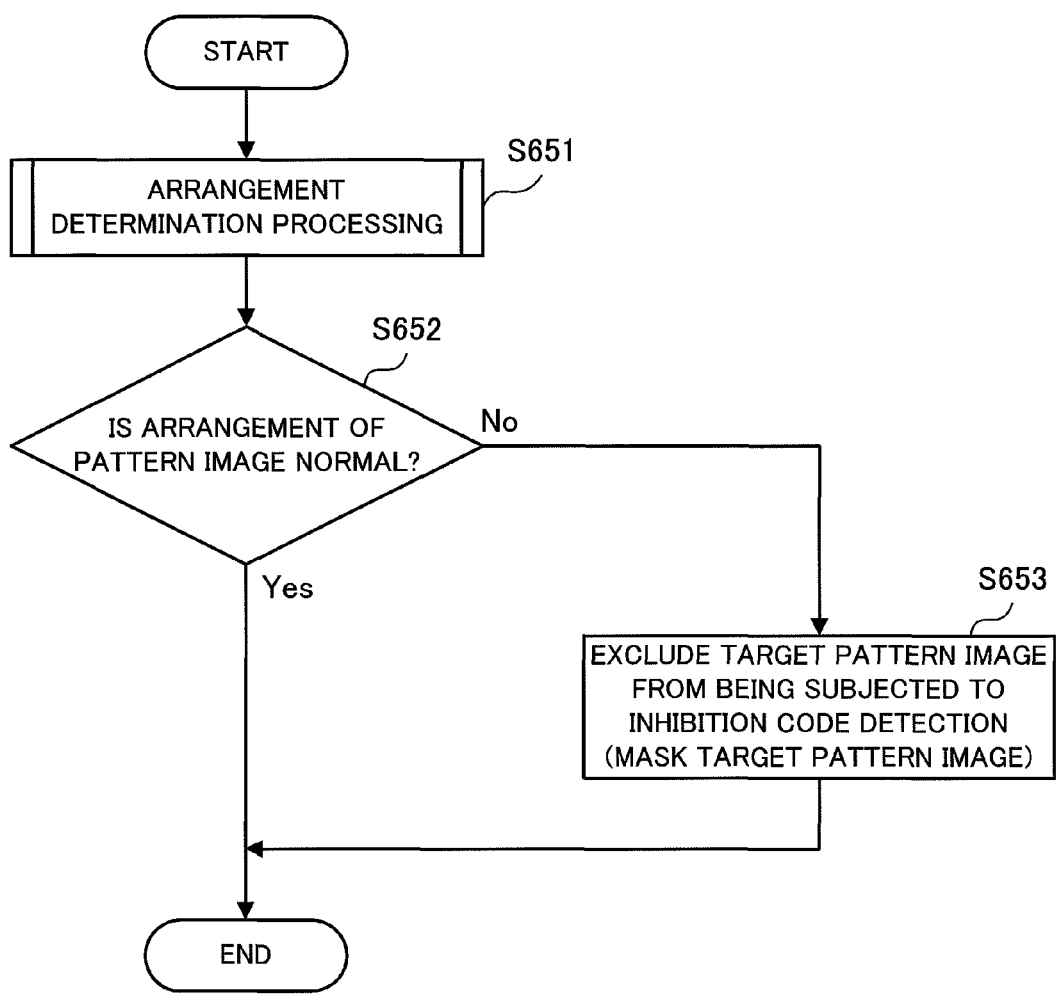
FIG. 26 is a flowchart illustrating an operation example during the pattern image masking processing.

FIG. 26 is a flowchart illustrating an operation example during the pattern image masking processing. Prior to this operation example, it is assumed that the arrangement determination part 66 detects a center of a pattern image from image data outputted from the image reading part 11, and holds the center as pattern center data. For example, a region having a predetermined size and surrounded by white pixels is recognized as a region of the pattern image, and then an intersecting point of a vertical straight line dividing the region into two equal parts and a horizontal straight line dividing the region into two equal parts is set to the center of the pattern image. In other words, in the eighth exemplary embodiment, the arrangement determination part 66 is provided as an example of a detection unit that detects a specified image.

Once the operation is initiated, the arrangement determination part 66 firstly performs an arrangement determination processing for determining whether or not an arrangement of a pattern image is normal (step 651). Since this arrangement determination processing has been described in detail in the seventh exemplary embodiment, the description thereof is omitted.

Then, the arrangement determination part 66 determines whether or not an arrangement of the pattern image is normal (step 652).

As a result, if it is determined that the arrangement of the pattern image is not normal, the pattern image is excluded from being subjected to the inhibition code detection, and then is masked (step 653).

On the other hand, if it is determined that the arrangement of the pattern image is normal, the processing is terminated with no further action. This is because, in the eighth exemplary embodiment, it is configured that each of the pattern images is subjected to the inhibition code detection unless information indicating that the target pattern image is excluded from being subjected to the inhibition code detection is outputted to the inhibition code detection part 14.

In the above description, the above-described processing is to be performed in the copying apparatus 10. However, the exemplary embodiments are not limited to such a case. For example, the above-described processing may be executed in a general-purpose computer 90.

Figure 27:
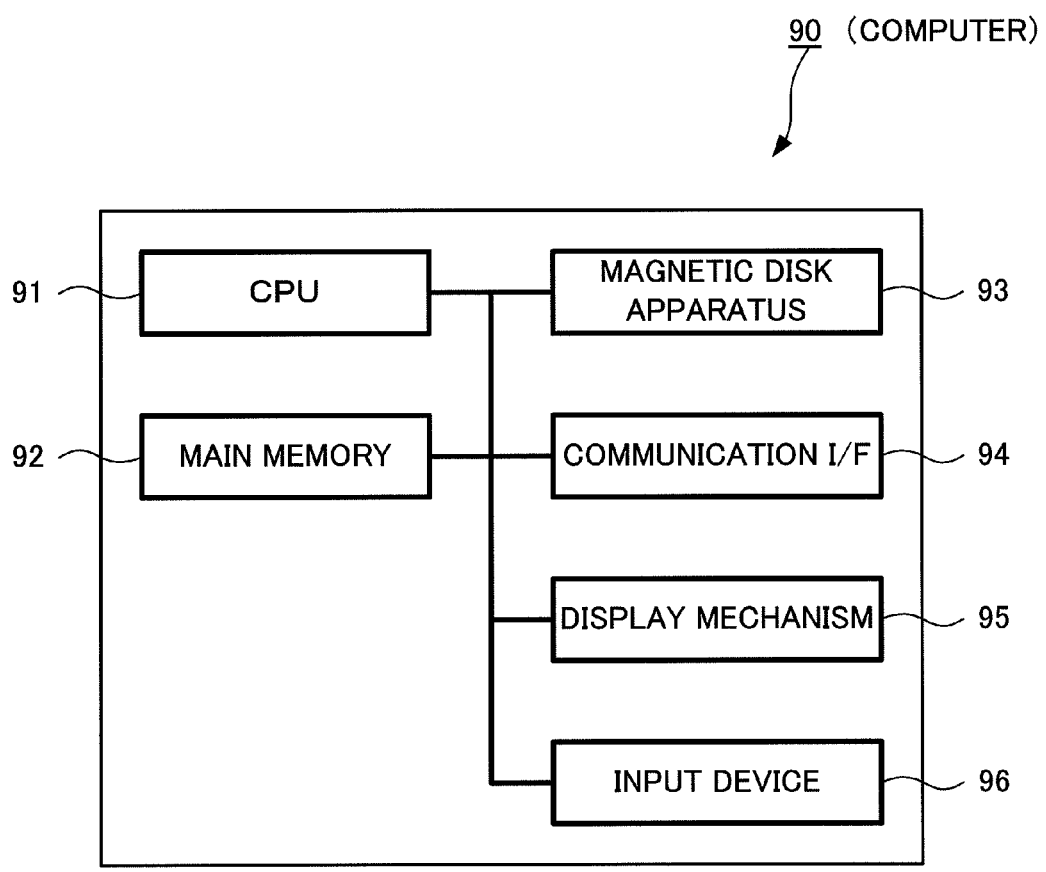
FIG. 27 is a diagram illustrating a hardware configuration of the computer.

FIG. 27 is a diagram illustrating a hardware configuration of the computer 90.

As shown in the figure, the computer 90 is provided with a central processing unit (CPU) 91 as a computing unit, and a main memory 92 and a magnetic disk apparatus (HDD: hard disk drive) 93 that are a memory. Here, the CPU 91 executes an operating system (OS) and a various kinds of software such as application, and realizes the above-described respective functions. The main memory 92 is a memory area that stores various kinds of software, data used for the execution thereof, and the like. The magnetic disk apparatus 93 is a memory area that stores input data to the various kinds of software, output data from the various kinds of software, and the like.

Further, the computer 90 is provided with a communication I/F 94 that performs communication with the exterior, a display mechanism 95 including a video memory, a display and the like, and an input device 96 such as a keyboard, a mouse or the like.

The program that realizes the exemplary embodiments may be provided not only by a communication unit but also by being stored in a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processor comprising:
    a detection unit that detects a plurality of specified images each having a shape from an image read out by an image reading apparatus;
    a first angle determination unit that determines a rotation angle of each of the plurality of specified images detected by the detection unit by a first method on the basis of presence or absence of other specified image in a position determined in advance with respect to each of the plurality of specified images;
    a second angle determination unit that determines a rotation angle of each of the plurality of specified images detected by the detection unit by a second method on the basis of whether or not a pattern of each of the plurality of specified images and a pattern of an image representing a predetermined rotation angle match each other; and
    a processing target determination unit that determines whether or not each of the plurality of specified images is to be subjected to a processing on the basis of the rotation angle determined by the first angle determination unit and the rotation angle determined by the second angle determination unit.

2. The image processor according to claim 1, wherein, in the case where other specified image other than each of the plurality of specified images is present at least one of four positions on the circumference of a circle whose center is set to each of the plurality of specified images, which divide the circumference into four substantially equal parts, the first angle determination unit determines that an angle according to directions from each of the plurality of specified images to the four positions is the rotation angle of each of the plurality of specified images.

3. The image processor according to claim 1, wherein the first angle determination unit determines that an angle according to the directions from each of the plurality of specified images to the four positions is the rotation angle of each of the plurality of specified images in any one of the cases where an image is present at each of at least two positions out of the four positions, where an image is present at each of at least three positions out of the four positions, and where an image is present at each of the four positions.

4. The image processor according to claim 1, wherein:
    the detection unit detects the plurality of specified images from a specified region of the image read out by the image reading apparatus; and
    the processing target determination unit determines whether or not the specified region is to be subjected to the processing on the basis of a result of aggregate calculation of degrees of approximation between respective rotation angles determined by the first angle determination unit and respective rotation angles determined by the second angle determination unit, for the specified region.

5. The image processor according to claim 1, further comprising:
    an inhibited document determination unit that identifies a pattern of the specified image having been determined, by the processing target determination unit, to be subjected to the processing, and that determines whether or not a document including the image read out by the image reading apparatus is a copy-inhibited document on the basis of a number of the specified images for each identified pattern.

6. An image processing method comprising:
    detecting a plurality of specified images each having a shape from an image read out by an image reading apparatus;
    determining presence or absence of other specified image in a position determined in advance with respect to each of the plurality of specified images;
    determining whether or not a pattern of each of the plurality of specified images and a pattern of an image representing a predetermined rotation angle match each other; and
    further determining whether or not each of the plurality of specified images is to be subjected to a processing on the basis of a result of the determination of the presence or absence of the other specified image and whether or not the pattern of each of the plurality of specified images and the pattern of the image representing the predetermined rotation angle match each other.

7. The image processing method according to claim 6, further comprising:
    identifying a pattern of the specified image having been determined to be subjected to the processing, and
    determining whether or not a document including the image read out by the image reading apparatus is a copy-inhibited document on the basis of a number of the specified images for each identified pattern.

8. A non-transitory computer readable medium storing a program causing a computer to execute a process for detecting a plurality of specified images used for a process, the process comprising:

determining a rotation angle of each of the plurality of specified images by a first method on the basis of presence or absence of other specified image in a position determined in advance with respect to each of the plurality of specified images; and determining a rotation angle of each of the plurality of specified images by a second method on the basis of whether or not a pattern of each of the plurality of specified images and a pattern of an image representing a predetermined rotation angle match each other, wherein a specified region is determined whether or not to be subjected to a processing on the basis of a result of aggregate calculation of degrees of approximation between respective rotation angles determined by the first method and respective rotation angles determined by the second method, for the specified region.

9. The non-transitory computer readable medium according to claim 8, further comprising:

identifying a pattern of the specified image having been determined to be subjected to the processing, and determining whether or not a document including the image read out by the image reading apparatus is a copy-inhibited document on the basis of a number of the specified images for each identified pattern.

* * * * *